US012277256B2

(12) United States Patent
Kwak et al.

(10) Patent No.: US 12,277,256 B2
(45) Date of Patent: Apr. 15, 2025

(54) STORAGE DEVICE AND SOLID STATE DRIVE DEVICE WITH STRUCTURE FOR IMPROVING SECURITY PERFORMANCE AND REMOVING DATA, METHOD OF OPERATING THE SAME, AND DATA CENTER INCLUDING THE SAME

(71) Applicant: SAMSUNG ELECTRONICS CO., LTD., Suwon-si (KR)

(72) Inventors: Insub Kwak, Seoul (KR); Sungki Lee, Seoul (KR); Chunghyun Ryu, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 899 days.

(21) Appl. No.: 17/130,989

(22) Filed: Dec. 22, 2020

(65) Prior Publication Data
US 2021/0334414 A1 Oct. 28, 2021

(30) Foreign Application Priority Data

Apr. 22, 2020 (KR) .......................... 10-2020-0048457

(51) Int. Cl.
 *G06F 21/78* (2013.01)
 *G06F 3/06* (2006.01)
 (Continued)

(52) U.S. Cl.
 CPC .............. *G06F 21/78* (2013.01); *G06F 3/062* (2013.01); *G06F 3/0652* (2013.01);
 (Continued)

(58) Field of Classification Search
 CPC ........ G06F 21/78; G06F 3/062; G06F 3/0652; G06F 3/0679; H01L 23/053; H01L 23/576
 See application file for complete search history.

(56) References Cited

U.S. PATENT DOCUMENTS 6,292,898 B1\* 9/2001 Sutherland .............. G06F 21/87
 713/193
7,519,763 B2\* 4/2009 McLean .................. G06F 21/86
 711/100
(Continued)

FOREIGN PATENT DOCUMENTS

KR 10-0296371 5/2001
KR 1020070033601 3/2007
(Continued)

OTHER PUBLICATIONS

Office Action received in corresponding Taiwan Patent Application No. 109146511 dated Jun. 28, 2024.

*Primary Examiner* — Jung W Kim
*Assistant Examiner* — Alan L Kong
(74) *Attorney, Agent, or Firm* — F. Chau & Associates, LLC

(57) ABSTRACT

A storage device includes a substrate, at least one data storage element, a case, and at least one sensing pin. The substrate includes at least one security pad. The data storage element is mounted on the substrate. The case surrounds the substrate and the data storage element, and includes at least one contact structure for an electrical connection with the security pad. The sensing pin receives an electrical signal. A level of the electrical signal varies by detecting a change in a resistance according to whether the security pad is electrically connected to the contact structure. When at least a part of the case is removed, a level change of the electrical signal is detected, and a secure erase process for data stored in the data storage element is performed.

16 Claims, 27 Drawing Sheets

(51) Int. Cl.
*H01L 23/00* (2006.01)
*H01L 23/053* (2006.01)

(52) U.S. Cl.
CPC .......... *G06F 3/0679* (2013.01); *H01L 23/053* (2013.01); *H01L 23/576* (2013.01)

(56) References Cited

U.S. PATENT DOCUMENTS

| | | | |
|---|---|---|---|
| 7,868,441 B2 | 1/2011 | Eaton et al. | |
| 7,945,792 B2 | 5/2011 | Cherpantier | |
| 8,339,794 B2 | 12/2012 | Bang et al. | |
| 8,359,660 B2* | 1/2013 | Lang | G06F 21/79 |
| | | | 726/34 |
| 8,880,903 B2 | 11/2014 | Roberts et al. | |
| 9,230,609 B2* | 1/2016 | Frans | G11C 7/10 |
| 9,730,315 B1* | 8/2017 | Razaghi | H05K 1/0275 |
| 9,941,004 B2 | 4/2018 | Brightsky et al. | |
| 10,311,929 B2 | 6/2019 | Aikawa et al. | |
| 2007/0164407 A1* | 7/2007 | Jun | H01L 25/0657 |
| | | | 257/668 |
| 2008/0251905 A1* | 10/2008 | Pope | H01L 25/16 |
| | | | 257/679 |
| 2009/0106563 A1* | 4/2009 | Cherpantier | G06F 21/86 |
| | | | 726/34 |
| 2012/0011565 A1* | 1/2012 | Garlie | G06F 21/6245 |
| | | | 726/2 |
| 2012/0185636 A1* | 7/2012 | Leon | H01L 23/576 |
| | | | 711/E12.001 |
| 2014/0230079 A1* | 2/2014 | Alam | G11C 11/1695 |
| | | | 726/34 |
| 2017/0229173 A1* | 8/2017 | BrightSky | G11C 13/0059 |
| 2018/0253632 A1* | 9/2018 | Uland | H01L 23/544 |
| 2019/0095656 A1* | 3/2019 | Norton | H05K 5/0208 |
| 2021/0141946 A1* | 5/2021 | Lee | H04L 9/0894 |

FOREIGN PATENT DOCUMENTS

| | | |
|---|---|---|
| KR | 10-0988414 | 10/2010 |
| KR | 10-1697104 | 1/2017 |
| KR | 10-1745243 | 6/2017 |
| KR | 10-2008691 | 8/2019 |
| TW | I627772 B | 6/2018 |

* cited by examiner

STORAGE DEVICE AND SOLID STATE DRIVE DEVICE WITH STRUCTURE FOR IMPROVING SECURITY PERFORMANCE AND REMOVING DATA, METHOD OF OPERATING THE SAME, AND DATA CENTER INCLUDING THE SAME

CROSS-REFERENCE TO RELATED APPLICATION

This application claims priority under 35 U.S.C. § 119 to Korean Patent Application No. 10-2020-0048457, filed on Apr. 22, 2020 in the Korean Intellectual Property Office (KIPO), the disclosure of which is incorporated by reference herein in its entirety.

TECHNICAL FIELD

Exemplary embodiments of the inventive concept relate generally to semiconductor integrated circuits, and more particularly, to storage devices and solid state drive (SSD) devices with structures for improving security performance and removing data, methods of operating the storage devices, and data centers including the storage devices.

DISCUSSION OF RELATED ART

Hard disk drive (HDD) devices are typically used as data storages for electronic devices. Recently, however, solid state drive (SSD) devices including nonvolatile memory devices, such as flash memories, are being used instead of HDD devices as data storages for electronic devices.

SSD devices are advantageous over HDD devices because SSD devices do not include a mechanical device, such as a motor, and almost no heat and no noise are produced in SSD devices. In addition, SSD devices also have advantages of fast access rate, high density, and high stability.

Recently, as the industry has advanced, the storage and management of secure data has become increasingly important, and applications for reinforcing security are being developed in various fields such as defense, finance, etc. SSD devices are media that have the advantages of low power and high speed; however, there may be a high possibility of security problems such as data leakage in the event of loss or theft.

SUMMARY

According to an exemplary embodiment of the inventive concept, a storage device includes a substrate, at least one data storage element, a case, and at least one sensing pin. The substrate includes at least one security pad. The at least one data storage element is mounted on the substrate. The case surrounds the substrate and the at least one data storage element, and includes at least one contact structure for an electrical connection with the at least one security pad. The at least one sensing pin receives an electrical signal. A level of the electrical signal varies by detecting a change in a resistance according to whether the at least one security pad is electrically connected to the at least one contact structure. When at least a part of the case is removed, a level change of the electrical signal is detected, and a secure erase process for data stored in the at least one data storage element is performed.

According to an exemplary embodiment of the inventive concept, in a method of operating a storage device, an abnormal access to the storage device is detected using a plurality of physical sensing structures included in the storage device. When the abnormal access to the storage device is detected, a step-wise secure process, in which two or more secure algorithms associated with data stored in the storage device are sequentially executed, is performed. The storage device includes at least one security pad, at least one data storage element, at least one contact structure, and at least one sensing pin. The at least one data storage element stores the data. The at least one contact structure is a structure for an electrical connection with the at least one security pad. The at least one sensing pin receives an electrical signal. A level of the electrical signal varies by detecting a change in a resistance according to whether the at least one security pad is electrically connected to the at least one contact structure. The at least one security pad and the at least one contact structure form at least one of the plurality of physical sensing structures. When a level change of the electrical signal is detected, at least one of the two or more secure algorithms is executed.

According to an exemplary embodiment of the inventive concept, a solid state drive (SSD) device includes a substrate, a plurality of nonvolatile memories, at least one secure memory, a controller, a case, and at least one sensing pin. The substrate includes at least one security pad. The plurality of nonvolatile memories are mounted on the substrate and store normal data. The at least one secure memory is mounted on the substrate and stores secure data. The controller is mounted on the substrate and controls operations of the plurality of nonvolatile memories and the secure memory. The case surrounds the substrate, the plurality of nonvolatile memories, the secure memory, and the controller, and includes at least one contact structure for an electrical connection with the at least one security pad. The at least one sensing pin receives an electrical signal. A level of the electrical signal varies by detecting a change in a resistance according to whether the at least one security pad is electrically connected to the at least one contact structure. When at least a part of the case is removed, a level change of the electrical signal is detected, and a secure erase process for permanently deleting at least one of the normal data stored in the plurality of nonvolatile memories and the secure data stored in the at least one secure memory is performed.

According to an exemplary embodiment of the inventive concept, a data center includes at least one application server and at least one storage server. The at least one application server receives a data write request or a data read request. The at least one storage server includes a storage device configured to store write data corresponding to the data write request or to output read data corresponding to the data read request. The storage device includes a substrate, at least one data storage element, a case, and at least one sensing pin. The substrate includes at least one security pad. The at least one data storage element is mounted on the substrate. The case surrounds the substrate and the at least one data storage element, and includes at least one contact structure for an electrical connection with the at least one security pad. The at least one sensing pin receives an electrical signal. A level of the electrical signal varies by detecting a change in a resistance according to whether the at least one security pad is electrically connected to the at least one contact structure. When at least a part of the case is removed, a level change of the electrical signal is detected, and a secure erase process for permanently deleting data stored in the at least one data storage element is performed.

According to an exemplary embodiment of the inventive concept, a storage device includes a substrate, a plurality of security pads disposed on the substrate, a data storage element mounted on the substrate, and a case surrounding the substrate and including a plurality of protrusions. The plurality of protrusions correspond to the plurality of security pads. A conductive polymer is formed on at least one of the plurality of protrusions to electrically contact at least one of the plurality of security pads. When the conductive polymer does not electrically contact the at least one of the plurality of security pads, a secure erase process for data stored in the data storage element is performed.

BRIEF DESCRIPTION OF THE DRAWINGS

The above and other features of the inventive concept will be more clearly understood by describing in detail exemplary embodiments thereof with reference to the accompanying drawings.

DETAILED DESCRIPTION OF THE EMBODIMENTS

Figure 1:
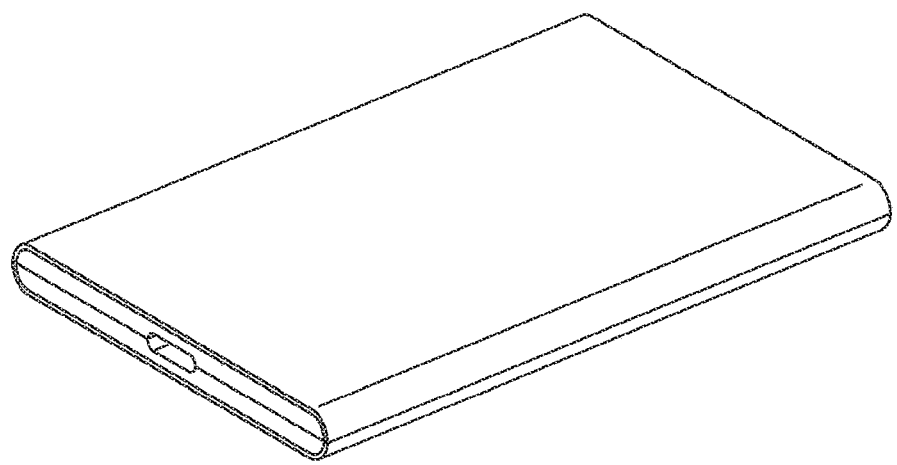
FIG. 1 is a perspective view of a storage device according to an exemplary embodiment of the inventive concept.

Exemplary embodiments of the inventive concept provide a storage device and a solid state drive (SSD) device having a structure capable of improving security performance and efficiently removing data when it is detected that a case is opened or damaged.

Exemplary embodiments of the inventive concept also provide a method of operating the storage device and/or the SSD device.

Exemplary embodiments of the inventive concept further provide a data center that includes the storage device and/or the SSD device.

Exemplary embodiments of the inventive concept will be described more fully hereinafter with reference to the accompanying drawings. Like reference numerals may refer to like elements throughout this application.

Figure 2:
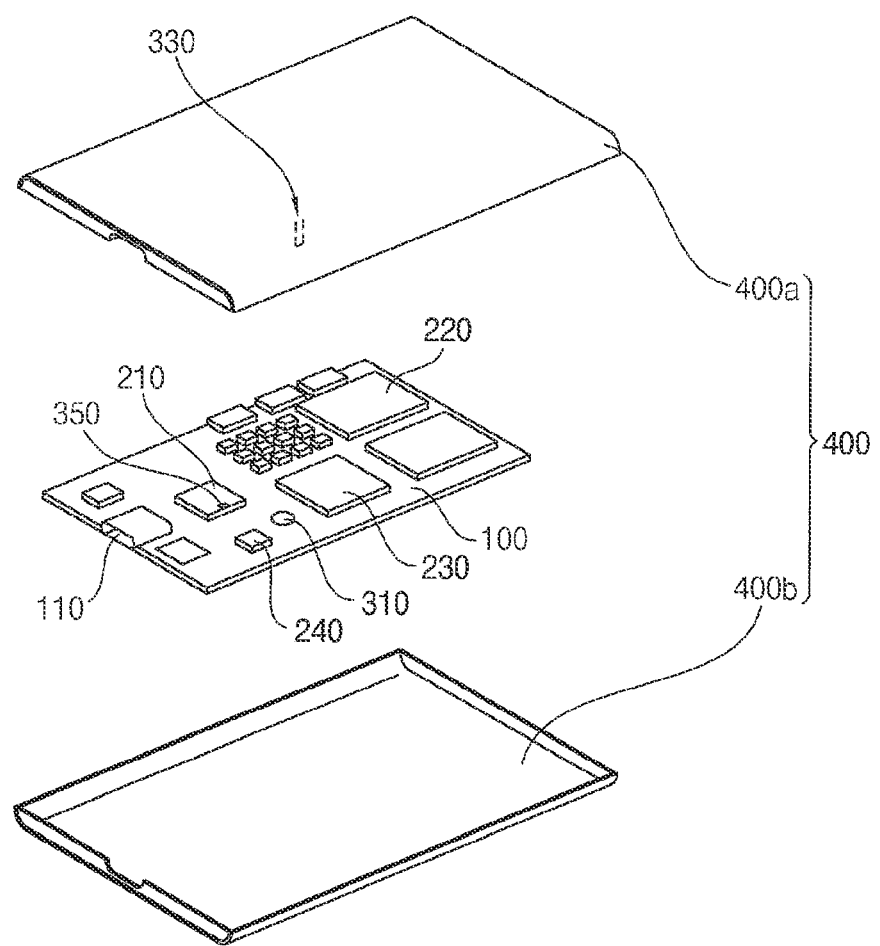
FIG. 2 is an exploded perspective view of the storage device of FIG. 1 according to an exemplary embodiment of the inventive concept.

FIG. 1 is a perspective view of a storage device according to an exemplary embodiment of the inventive concept. FIG. 2 is an exploded perspective view of the storage device of FIG. 1 according to an exemplary embodiment of the inventive concept.

Referring to FIGS. 1 and 2, a storage device 10 includes a substrate 100, a plurality of electronic elements (or electronic components) 210, 220, 230, and 240 mounted or disposed on the substrate 100, a case 400 surrounding the substrate 100 and the electronic elements 210, 220, 230, and 240, at least one security pad 310, at least one contact structure 330, and at least one sensing pin 350. The storage device 10 may further include a bracket covering the electronic elements 210, 220, 230, and 240, a heat dissipating pad being in thermal communication with the electronic elements 210, 220, 230, and 240, etc.

In exemplary embodiments of the inventive concept, the storage device 10 may be a solid state drive (SSD) device. For example, the storage device 10 may be a SSD device used in a data center, a server, etc. that collects various data and provides various services, and/or may be a portable SSD device for replacing a hard disk drive (HDD) device used in a personal computer (PC), a laptop, etc.

Hereinafter, exemplary embodiments will be described based on an example where the storage device 10 is a SSD device. However, the inventive concept is not limited thereto, and the storage device 10 may be one of a universal flash storage (UFS), a multimedia card (MMC), an embedded multimedia card (eMMC), a secure digital (SD) card, a micro SD card, a memory stick, a chip card, a universal serial bus (USB) card, a smart card, a compact flash (CF) card, or the like.

The substrate 100 may be a single-layered or multi-layered circuit substrate having an upper surface and a lower surface opposite to each other. For example, the substrate 100 may be a printed circuit board (PCB). The PCB may include wirings and vias connected to the wirings. The wirings may include printed circuit patterns for interconnection with the electronic elements (e.g., 210, 220, 230, and 240).

The substrate 100 may extend in a first direction (e.g., a lengthwise direction). The substrate 100 may have a rectangular or square shape. The substrate 100 may have a first side portion and a second side portion opposite to each other. A connector 110 having connection terminals for connection with an external host device may be provided in the first side portion of the substrate 100. The storage device 10 may be attached to or detached from the external host device through the connector 110. Accordingly, the storage device 10 may be electrically connected to the external host device through the connector 110.

The plurality of electronic elements 210, 220, 230, and 240 may be mounted on the substrate 100 along the first direction to be provided as the storage device 10. The plurality of electronic elements 210, 220, 230, and 240 may include a controller (or a storage controller) 210, a plurality of nonvolatile memories 220, a buffer memory 230, and a secure element 240. The plurality of nonvolatile memories 220 and/or the secure element 240 may form a data storage element according to an exemplary embodiment of the inventive concept.

The controller 210 may be disposed or positioned adjacent to the connector 110 on the upper surface of the substrate 100. The plurality of nonvolatile memories 220 may be disposed or positioned adjacent to the second side portion opposite to the connector 110 on the upper surface of the substrate 100. For example, as illustrated in FIG. 2, two nonvolatile memories 220 may be disposed on the upper surface of the substrate 100. According to an exemplary embodiment of the inventive concept, the nonvolatile memories may be additionally disposed on the lower surface of the substrate 100. The buffer memory 230 and the secure element 240 may be disposed or positioned adjacent to the controller 210 on the upper surface of the substrate 100.

The controller 210 may control overall operations of the storage device 10, may control operations of the plurality of nonvolatile memories 220, the buffer memory 230, and the secure element 240, and may communicate signals with the external host device using a host interface. For example, the signals communicated between the controller 210 and the external host device may include a command, an address, data, etc. The controller 210 may analyze and process the signals received from the external host device, and may control the operation of the plurality of nonvolatile memories 220 based on the received command, address, and data.

In exemplary embodiments of the inventive concept, the host interface may include a block accessible interface which may include, for example, a universal serial bus (USB), a small computer system interface (SCSI) bus, a peripheral component interconnect (PCI) express bus, an advanced technology attachment (ATA) bus, a serial ATA (SATA) bus, a parallel ATA (PATA) bus, a serial attached SCSI (SAS) bus, a nonvolatile memory express (NVMe) bus, or the like. The storage device 10 may use a block accessible address space corresponding to an access size of the plurality of nonvolatile memories 220 to provide the block accessible interface to the external host device, for allowing access by units of memory blocks with respect to data stored in the plurality of nonvolatile memories 220.

The plurality of nonvolatile memories 220 may be used as a storage medium of the storage device 10, and may be connected to the controller 210 through at least one channel For example, the plurality of nonvolatile memories 220 may store normal data, e.g., meta data, various user data, or the like.

In exemplary embodiments of the inventive concept, each of the plurality of nonvolatile memories 220 may include a NAND flash memory. In exemplary embodiments of the inventive concept, each of the plurality of nonvolatile memories 220 may include one of a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), or the like.

The buffer memory 230 may store instructions and/or data that are executed and/or processed by the controller 210, and may temporarily store data stored in or to be stored into the plurality of nonvolatile memories 220. In addition, the buffer memory 230 may be used to drive software and/or firmware used for effective management of the plurality of nonvolatile memories 220. Further, the buffer memory 230 may be used to store meta data received from the external host device and/or may be used to store cache data.

In exemplary embodiments of the inventive concept, the buffer memory 230 may include a volatile memory, e.g., a dynamic random access memory (DRAM), a static random access memory (SRAM), or the like. In exemplary embodiments of the inventive concept, the buffer memory 230 may include at least one of various nonvolatile memories.

The secure element 240 may be implemented in the form of a secure memory and/or any security device. The secure element 240 may process and/or may store secure data such as a cryptographic key, sensitive data, a sensitive code, or the like. For example, the secure element 240 may be resistant against tampering attacks, such as micro-probing, a software attack, eavesdropping, a fault injection attack, etc. The secure element 240 may be referred to as a security hardware, a security component, or a security module.

According to an exemplary embodiment of the inventive concept, the storage device may further include a power management integrated circuit (PMIC) for controlling power of the plurality of electronic elements 210, 220, 230, and 240, passive elements such as capacitors, etc.

The substrate 100 and the plurality of electronic elements 210, 220, 230, and 240 may be fastened to the case 400, so that the substrate 100 and the plurality of electronic elements 210, 220, 230, and 240 may be positioned fixedly within the case 400. For example, the case 400 may include a lower case 400*b* on which the substrate 100 is mounted, and an upper case 400*a* coupled with the lower case 400*b* to cover the substrate 100 and the plurality of electronic elements 210, 220, 230, and 240. However, the inventive concept is not limited thereto, and the upper case 400*a* and the lower case 400*b* may be integrally formed.

In exemplary embodiments of the inventive concept, the case 400 may include at least one of various materials, such as a metal, a plastic (e.g., a polymer), a film, a material coated with epoxy, etc.

The substrate 100 includes the at least one security pad 310, and the case 400 includes the at least one contact structure (or bonding structure) 330 for an electrical connection or contact with the security pad 310. In the storage device 10 according to exemplary embodiments of the inventive concept, the security pad 310 may be formed, provided, or applied in the substrate 100 rather than the case 400.

The security pad 310 and the contact structure 330 may form one physical sensing structure, and each of the security pad 310 and the contact structure 330 may include a conductive material for the electrical connection. For example, when the security pad 310 is disposed on the upper surface of the substrate 100 as illustrated in FIG. 2, the contact structure 330 may be formed in the upper case 400a. However, the inventive concept is not limited thereto, and the contact structure 330 may be formed in the lower case 400b when the security pad 310 is disposed on the lower surface of the substrate 100.

Although FIG. 2 illustrates only one security pad 310 and one contact structure 330, the storage device may include a plurality of security pads and a plurality of contact structures. In this example, the storage device may include a plurality of physical sensing structures because one security pad-contact structure pair forms one physical sensing structure.

The at least one sensing pin 350 is connected to the security pad 310. For example, as illustrated in FIG. 2, the sensing pin 350 may be included in the controller 210. However, the inventive concept is not limited thereto, and the sensing pin 350 may be included in the plurality of nonvolatile memories 220 and/or the secure element 240, or may be included in the substrate 100. For example, the sensing pin 350 may be a general purpose input/output (GPIO) pin.

The sensing pin 350 receives an electrical signal from the security pad 310. For example, the electrical signal may be a current signal and/or a voltage signal. A level of the electrical signal varies by detecting a change in a resistance according to whether the security pad 310 is electrically connected to the contact structure 330. For example, each of the security pad 310 and the contact structure 330 may include a resistive material having an inherent resistance. A level change of the electrical signal will be described with reference to FIGS. 3, 4A, and 4B.

In exemplary embodiments of the inventive concept, a pad and/or a pin may be a contact pad and/or a contact pin, but the inventive concept is not limited thereto.

The security pad 310, the contact structure 330, and the sensing pin 350 may be a structure for improving or enhancing the security performance of the storage device 10. For example, as will be described with reference to FIGS. 5 through 15, when at least a part of the case 400 is removed (or separated, opened, damaged, etc.), e.g., when the upper case 400a is removed, the level change of the electrical signal may be detected, and then a secure erase process for permanently deleting data stored in the data storage element (e.g., at least one of the normal data stored in the plurality of nonvolatile memories 220 and the secure data stored in the secure memory 240) may be performed. In other words, the secure erase process may be selectively performed based on the electrical signal. In the storage device 10 according to exemplary embodiments of the inventive concept, the deletion and/or blocking of data may be determined by detecting the change in the resistance based on the electrical connection between the security pad 310 and the contact structure 330 (e.g., based on a status of the case 400), e.g., by detecting a change in an internal resistance of the storage device 10. In addition, the electrical signal may not be transmitted to an outside of the storage device 10 but may be processed internally to determine whether to perform the secure erase process. For example, the secure erase process may be performed under the control of the controller 210, or may be performed by the data storage element (e.g., at least one of the plurality of nonvolatile memories 220 and the secure element 240) by itself.

In exemplary embodiments of the inventive concept, data deleted by the secure erase process may include the secure data stored in the secure element 240. In exemplary embodiments of the inventive concept, data deleted by the secure erase process may include map data (e.g., a logical-physical address mapping table) stored in the plurality of nonvolatile memories 220. In exemplary embodiments of the inventive concept, data deleted by the secure erase process may include user data stored in the plurality of nonvolatile memories 220.

According to exemplary embodiments of the inventive concept, in the event of theft, loss, or disuse of the storage device 10, the change of the electrical signal due to opening and/or damage of the case 400 may be detected, the data may be efficiently eliminated for improving or enhancing the security performance, and thus the leakage of data may be prevented. Additionally, the user may open the case 400 themselves to confirm the end of use and securely erase their data. The electrical elements may be reused because the electrical elements are not destroyed. Only a secure data area may be selectively deleted and a storage medium, which include a normal data area, may continue to be used.

Although FIG. 2 illustrates an example where the contact structure 330 is directly applied to the case 400 (e.g., to the upper case 400a), e.g., an example where the contact structure 330 is formed integrally with the case 400, the inventive concept is not limited thereto, and the contact structure 330 may be modified according to exemplary embodiments of the inventive concept. Various examples of the contact structure 330 will be described with reference to FIGS. 5 through 15.

Figure 3:
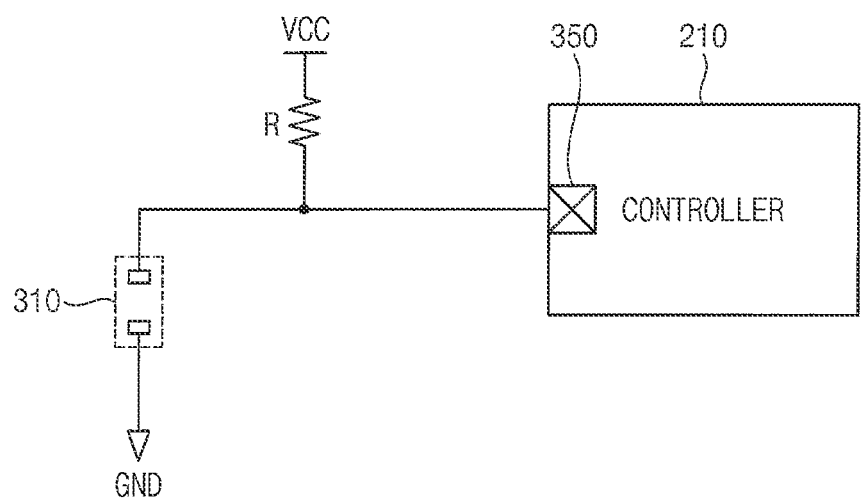
FIGS. 3, 4A, and 4B are diagrams for describing an operation of detecting a level change of an electrical signal by a sensing pin included in the storage device of FIG. 1 according to an exemplary embodiment of the inventive concept.
Figure 4A:
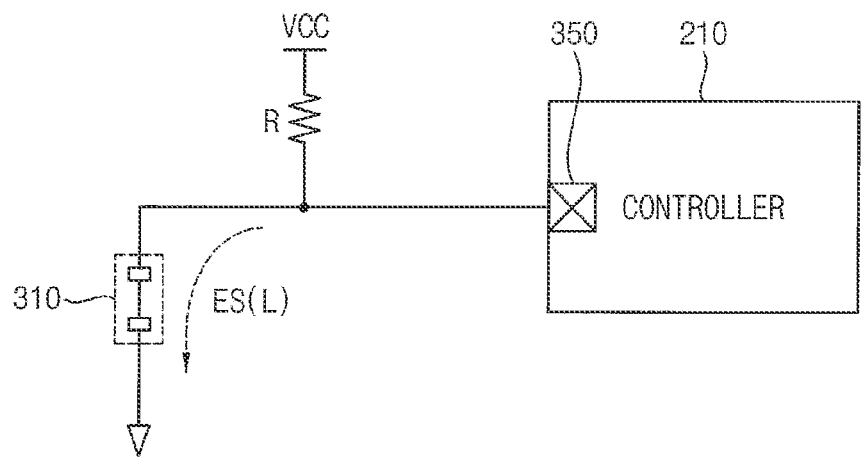
Figure 4B:
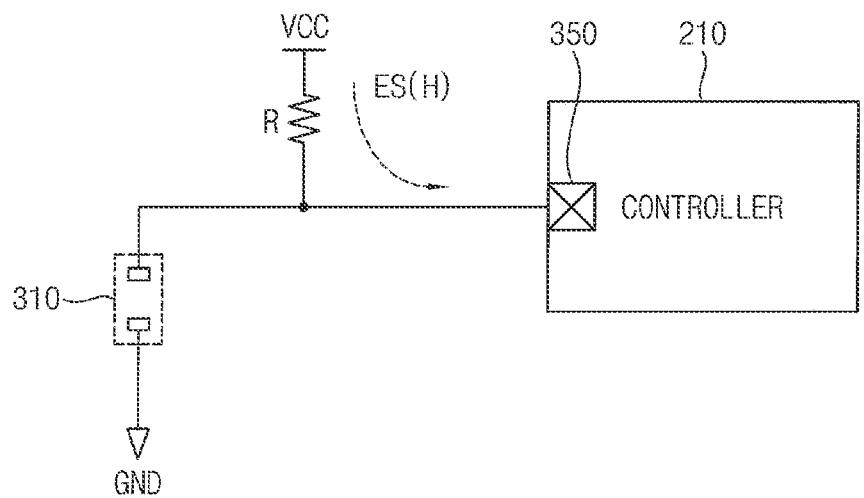

FIGS. 3, 4A, and 4B are diagrams for describing an operation of detecting a level change of an electrical signal by a sensing pin included in the storage device of FIG. 1 according to an exemplary embodiment of the inventive concept.

Referring to FIGS. 3, 4A, and 4B, the security pad 310, a resistor R, and the sensing pin 350 may be connected to one another. The resistor R may represent a resistance of the contact structure 330 in FIG. 2. The security pad 310 may be connected to a ground voltage GND, and the resistor R may be connected to a power supply voltage VCC. The sensing pin 350 may be included in the controller 210.

As illustrated in FIG. 4A, when the security pad 310 and the contact structure 330 are electrically connected (or in electrical contact with) to each other, e.g., when the case 400 is not opened or damaged and the upper case 400a and the lower case 400b are coupled with each other, the sensing pin 350 may be connected to the ground voltage GND through the security pad 310, and thus an electrical signal ES may have a first logic level (e.g., a low level L). In this case, the secure erase process may not be performed.

As illustrated in FIG. 4B, when the security pad 310 and the contact structure 330 are not electrically connected to each other, e.g., when the case 400 is opened or damaged and the upper case 400a and the lower case 400b are separated from each other, the sensing pin 350 may be connected to the power supply voltage VCC through the resistor R, and thus the electrical signal ES may have a second logic level (e.g., a high level H). In this case, the secure erase process may be performed based on the electrical signal ES. For example, since the sensing pin 350 is included in the controller 210, the secure erase process may be performed under the control of the controller 210 based on the electrical signal ES received through the sensing pin 350.

The above-described connection structure of the ground voltage GND and the power supply voltage VCC and the above-described level change of the electrical signal ES according to whether the security pad 310 and the contact structure 330 are electrically connected to each other may be an example, and the inventive concept is not limited thereto.

Hereinafter, exemplary embodiments of the inventive concept will be described based on an example where the security pad 310 is disposed on the upper surface of the substrate 100 and the contact structure 330 is formed in the upper case 400a, and based on an example where the data storage element includes the secure element 240 and the secure erase process is performed on the secure data stored in the secure element 240. However, the inventive concept is not limited thereto. For example, the security pad 310 may be disposed on the lower surface of the substrate 100, and/or the data storage element may include the plurality of nonvolatile memories 220 and the secure erase process may be performed on the map data and/or the user data stored in the plurality of nonvolatile memories 220. In other words, in all exemplary embodiments described later, the secure element may be replaced with the nonvolatile memory and the secure data may be replaced with the map data and/or the user data.

Figure 5:
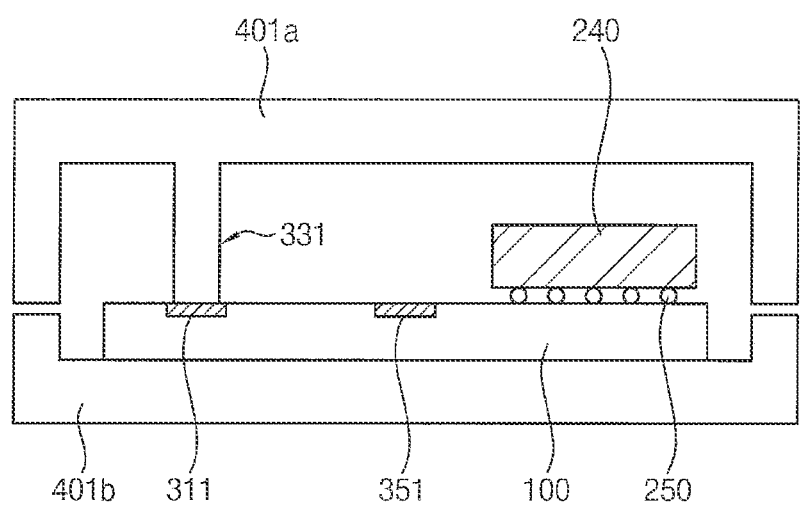
FIG. 5 is a cross-sectional view of a security pad, a contact structure, and a sensing pin included in the storage device of FIG. 1 according to an exemplary embodiment of the inventive concept.

FIG. 5 is a cross-sectional view of a security pad, a contact structure, and a sensing pin included in the storage device of FIG. 1 according to an exemplary embodiment of the inventive concept.

Referring to FIG. 5, the substrate 100 may be mounted and fixed on a lower case 401b. Although FIG. 5 illustrates that the substrate 100 is in direct contact with the lower case 401b, the substrate 100 and the lower case 401b may be spaced apart from each other and at least one space may be formed between the substrate 100 and the lower case 401b in an actual implementation.

The secure element 240 may be mounted on the substrate 100 via conductive bumps 250, for example, solder bumps. The secure element 240 and an upper case 401a may be spaced apart from each other and at least one space may be formed between the secure element 240 and the upper case 401a.

A security pad 311 may be disposed in the substrate 100. A sensing pin 351 may be disposed in the substrate 100 and may be electrically connected to the controller 210 and/or the secure element 240. According to an exemplary embodiment of the inventive concept, the security pad 311 and the sensing pin 351 may be connected to each other as described with reference to FIG. 3.

The contact structure may include a first protrusion 331 formed in the upper case 401a. The first protrusion 331 may be formed of the same material as the upper case 401a and may be integrally formed with the upper case 401a.

In the example of FIG. 5, the upper case 401a may be formed of a conductive material, and the first protrusion 331 may also be formed of a conductive material. Thus, the first protrusion 331 may be directly in contact with the security pad 311, and the level of the electrical signal ES detected by the sensing pin 351 may be changed according to whether the security pad 311 and the first protrusion 331 are in electrical contact. FIG. 5 illustrates an example where the substrate 100 on which the secure element 240 is mounted and the upper case 401a including the contact structure are directly connected.

Figure 6A:
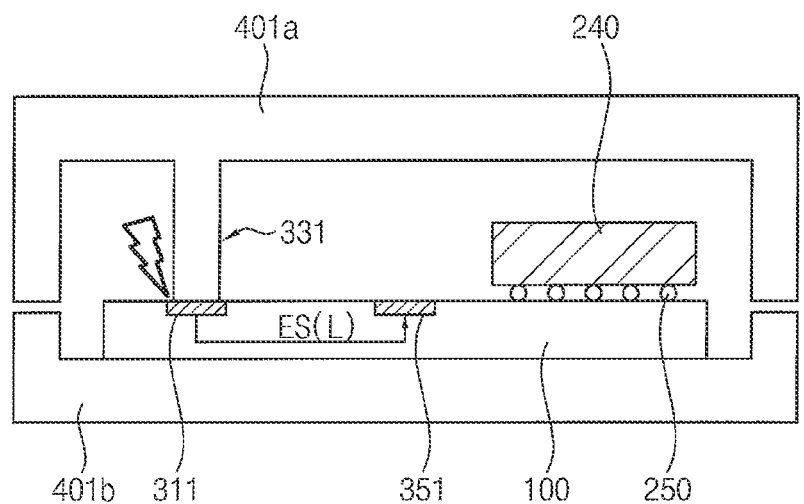
FIGS. 6A, 6B, and 6C are diagrams for describing a secure erase process using the security pad, the contact structure, and the sensing pin of FIG. 5 according to an exemplary embodiment of the inventive concept.
Figure 6B:
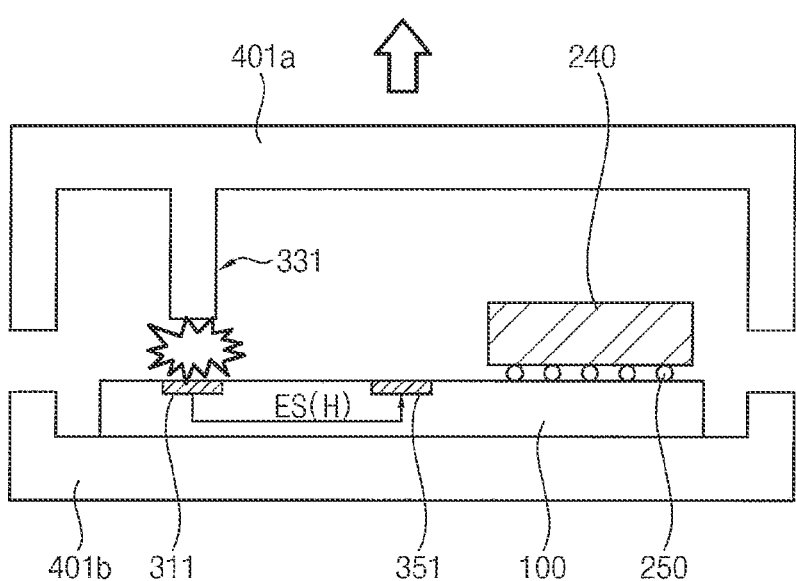
Figure 6C:
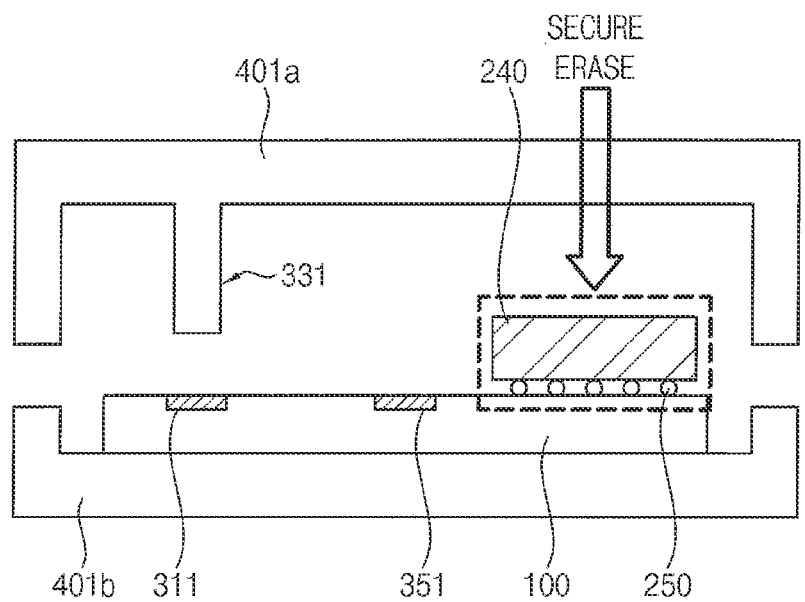

FIGS. 6A, 6B, and 6C are diagrams for describing a secure erase process using the security pad, the contact structure, and the sensing pin of FIG. 5 according to an exemplary embodiment of the inventive concept.

Referring to FIG. 6A, when the security pad 311 and the first protrusion 331 are in electrical contact with each other, the resistance may be maintained at an initial value, and the sensing pin 351 may receive the electrical signal ES having the first logic level (e.g., the low level L). In this case, the secure erase process may not be performed.

Referring to FIG. 6B, when the upper case 401a is removed or separated and the security pad 311 and the first protrusion 331 are not in electrical contact with each other, the resistance may be changed from the initial value, the level of the electrical signal ES may be changed, and then the sensing pin 351 may receive the electrical signal ES having the second logic level (e.g., the high level H).

Referring to FIG. 6C, when the sensing pin 351 receives the electrical signal ES having the second logic level, the secure erase process may be performed on the secure element 240. For example, the secure erase process may be performed under the control of the controller 210 or by the secure element 240 by itself.

Figure 7:
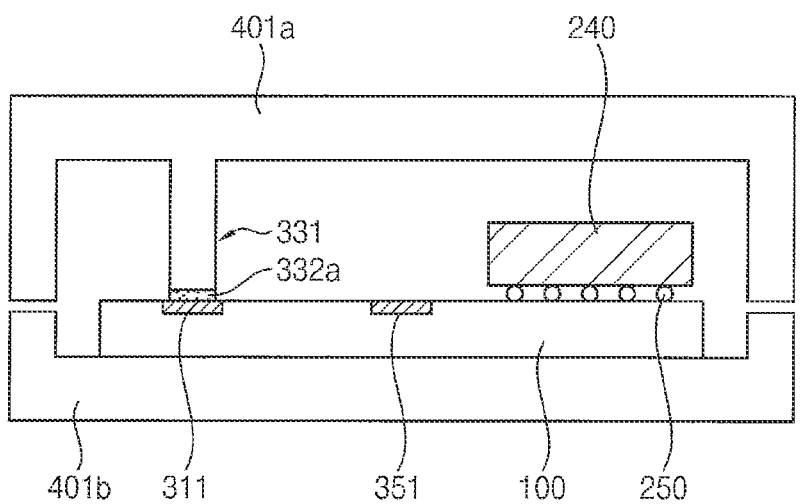
FIGS. 7 and 8 are cross-sectional views of a security pad, a contact structure, and a sensing pin included in the storage device of FIG. 1 according to exemplary embodiments of the inventive concept.
Figure 8:
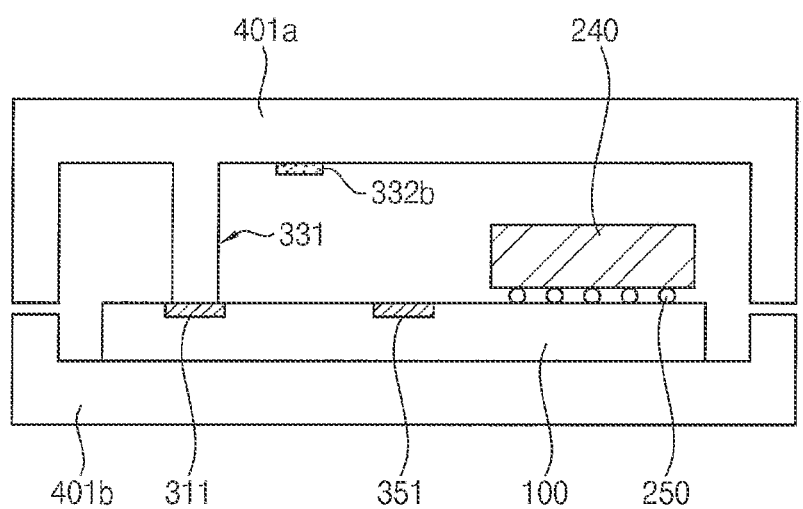

FIGS. 7 and 8 are cross-sectional views of a security pad, a contact structure, and a sensing pin included in the storage device of FIG. 1 according to exemplary embodiments of the inventive concept. Descriptions of elements already described with reference to FIG. 5 will be omitted.

Referring to FIGS. 7 and 8, the examples may be substantially the same as the example of FIG. 5, except that the contact structure includes the first protrusion 331 and resistive materials 332a and 332b in the examples of FIGS. 7 and 8.

In the example of FIG. 7, the resistive material 332a may be formed on the first protrusion 331. Unlike the first protrusion 331, the resistive material 332a may be an individual structure formed separately from the upper case 401a, and may be formed of a material different from that of the upper case 401a. Thus, the first protrusion 331 may not be directly in contact with the security pad 311, and the resistive material 332a formed on the first protrusion 331 may be directly in contact with the security pad 311. The level of the electrical signal ES sensed by the sensing pin 351 may be changed according to whether the security pad 311 and the resistive material 332a are in electrical contact.

When the separate or individual resistive material 332a is disposed and/or formed as illustrated in FIG. 7, the electrical connection between the security pad 311 and the contact structure according to exemplary embodiments of the inventive concept may be formed or implemented even if the upper case 401a and the first protrusion 331 are not formed of a conductive material. However, the inventive concept is not limited thereto, and the upper case 401a and the first protrusion 331 may be formed of a conductive material in the example of FIG. 7.

In the example of FIG. 8, the resistive material 332b may be formed in the upper case 401a to be spaced apart from the first protrusion 331. Thus, as with the example of FIG. 5, the first protrusion 331 may be directly in contact with the security pad 311. However, unlike the example of FIG. 5, the level of the electrical signal ES sensed by the sensing pin 351 may be changed according to the resistive material 332b and whether the security pad 311 and the first protrusion 331 are in electrical contact. In other words, not only whether the security pad 311 is in electrical contact with the first protrusion 331 but also with the resistive material 332b may be considered when the electrical signal ES is generated.

When the separate or individual resistive material 332b is disposed and/or formed as illustrated in FIG. 8, the upper case 401a and the first protrusion 331 may be formed of a conductive material.

In exemplary embodiments of the inventive concept, the resistive materials 332a and 332b may include an adhesive composite. The adhesive composite includes a metal layer and tapes having conductive properties, and may be used as a heat dissipation pad having heat dissipation properties. Thus, both thermal enhancement and a security function may be achieved when the adhesive composite is applied. However, the inventive concept is not limited thereto, and the resistive materials 332a and 332b may include any resistive and/or conductive material having an inherent resistance. The resistance desired or intended by the designer and/or user may be applied using the resistive materials 332a and 332b.

Figure 9:
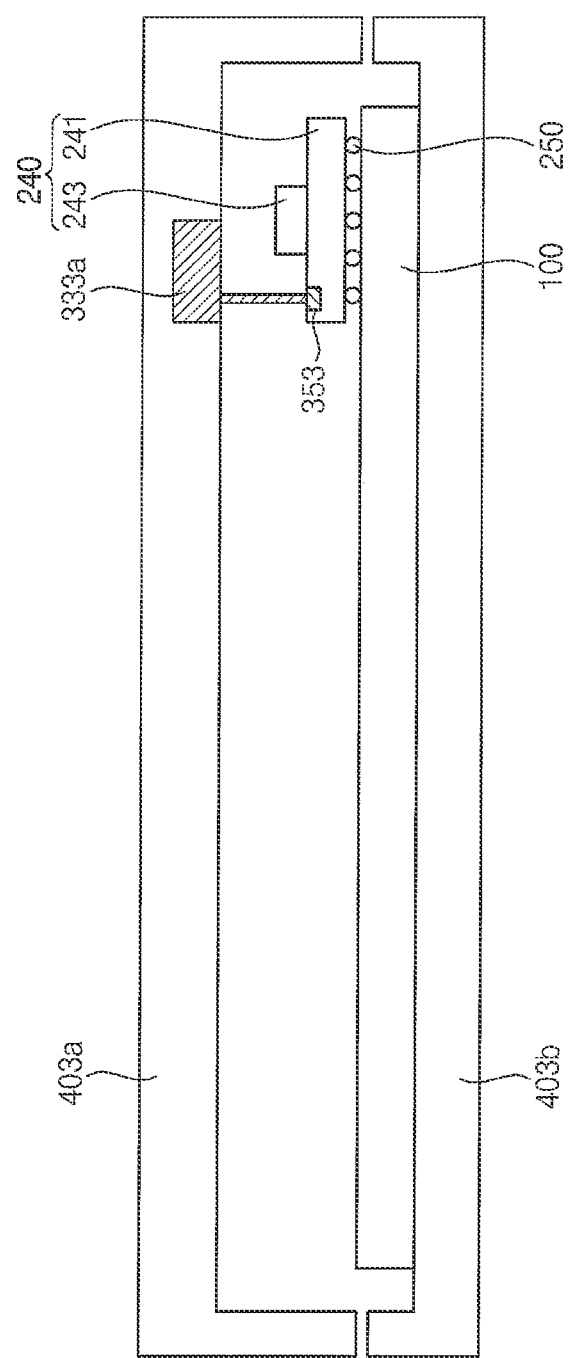
FIGS. 9 and 10 are cross-sectional views of a contact structure and a sensing pin included in the storage device of FIG. 1 according to exemplary embodiments of the inventive concept.
Figure 10:
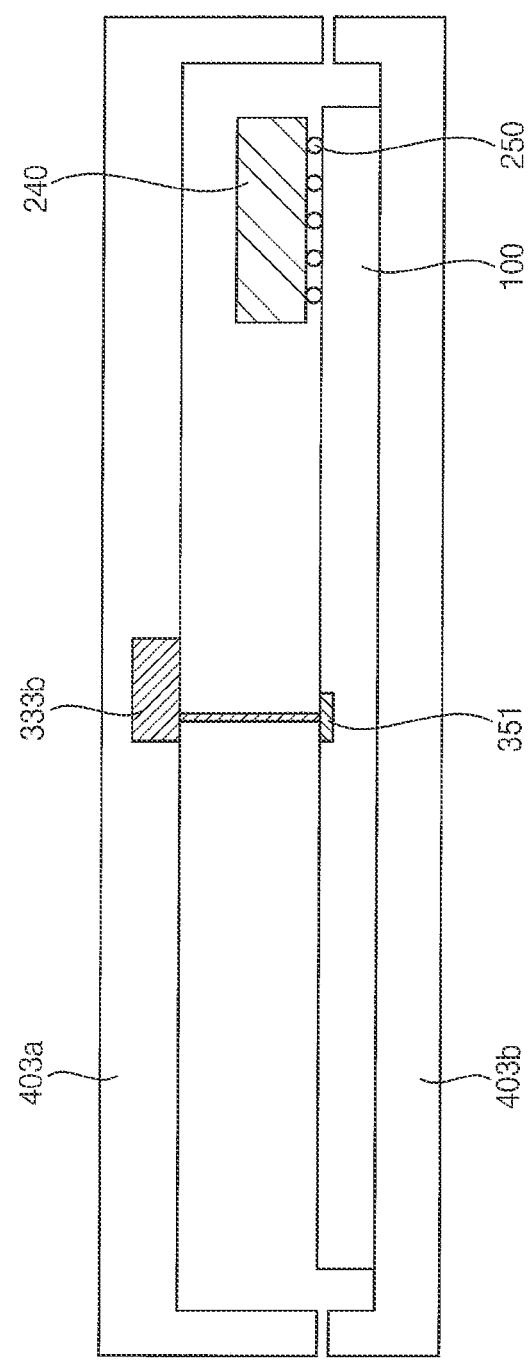

FIGS. 9 and 10 are cross-sectional views of a contact structure and a sensing pin included in the storage device of FIG. 1 according to exemplary embodiments of the inventive concept. The descriptions of elements already described with reference to FIG. 5 will be omitted.

Referring to FIG. 9, the substrate 100 may be mounted and fixed on a lower case 403b. The secure element 240 may be mounted on the substrate 100 via the conductive bumps 250.

The secure element 240 may include a package substrate 241 and a secure chip 243 mounted on the package substrate 241. In other words, the secure element 240 may be implemented in the form of a semiconductor package. A sensing pin 353 may be included in the secure element 240 and may be disposed on the package substrate 241.

The contact structure may include a security label 333a attached to an upper case 403a and electrically connected to the sensing pin 353. In other words, the security label 333a may be directly connected to the sensing pin 353. FIG. 9 illustrates an example where the secure element 240 and the upper case 403a including the contact structure are directly connected.

In the example of FIG. 9, the level of the electrical signal ES sensed by the sensing pin 353 may be changed according to whether the security label 333a included in the contact structure and the sensing pin 353 are in electrical contact. In this example, the security pad in the substrate 100 may be omitted.

Referring to FIG. 10, the substrate 100 may be mounted and fixed on the lower case 403b. The secure element 240 may be mounted on the substrate 100 via the conductive bumps 250. The sensing pin 351 may be disposed in the substrate 100.

The contact structure may include a security label 333b attached to the upper case 403a and electrically connected to the sensing pin 351. In other words, the security label 333b may be directly connected to the sensing pin 351.

In the example of FIG. 10, the level of the electrical signal ES sensed by the sensing pin 351 may be changed according to whether the security label 333b included in the contact structure and the sensing pin 351 are in electrical contact. In this example, the security pad in the substrate 100 may be omitted.

In exemplary embodiments of the inventive concept, the security labels 333a and 333b may include any conductive material for an electrical connection or contact with the sensing pins 351 and 353. In exemplary embodiments of the inventive concept, the security labels 333a and 333b may be replaced with any security component or instrument including any conductive material.

According to exemplary embodiments of the inventive concept, the security labels 333a and 333b may be implemented to be electrically directly connected to the security pad in the substrate 100.

Figure 11:
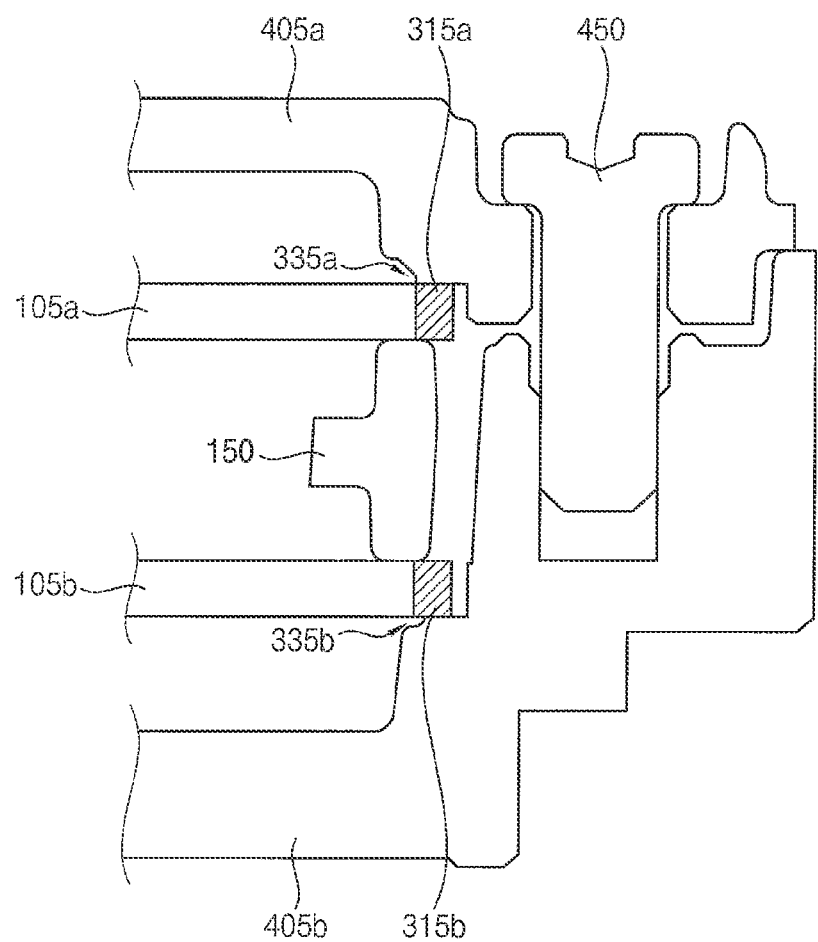
FIGS. 11 and 12 are cross-sectional views of a security pad, a contact structure, and a sensing pin included in the storage device of FIG. 1 according to an exemplary embodiment of the inventive concept.
Figure 12:
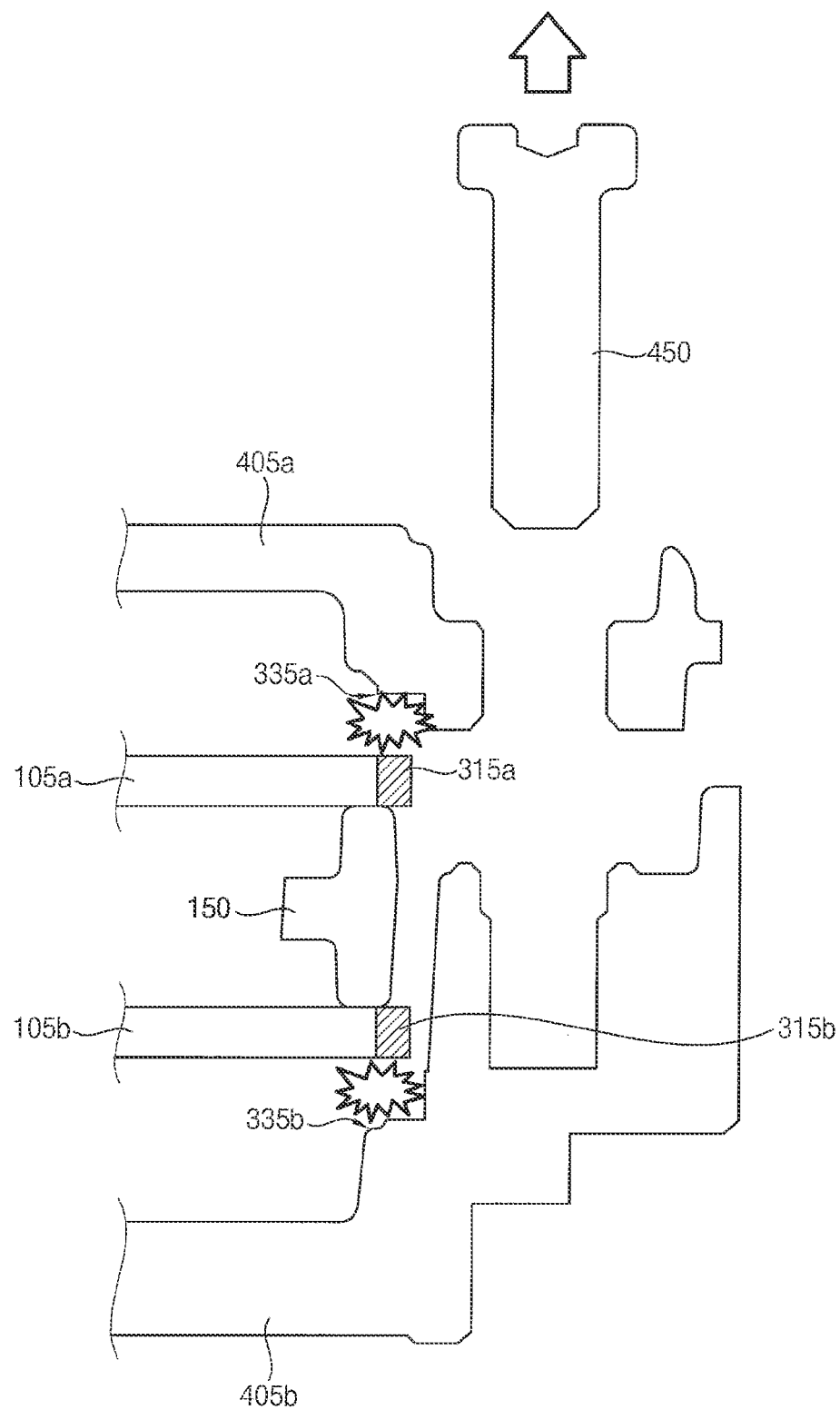

FIGS. 11 and 12 are cross-sectional views of a security pad, a contact structure, and a sensing pin included in the storage device of FIG. 1 according to an exemplary embodiment of the inventive concept.

FIG. 11 illustrates that an upper case 405a and a lower case 405b are coupled with each other, and security pads 315a and 315b and contact structures 335a and 335b are in electrical contact with each other. FIG. 12 illustrates that the upper case 405a and the lower case 405b are separated from each other and the security pads 315a and 315b and the contact structures 335a and 335b are not in electrical contact with each other.

Referring to FIGS. 11 and 12, the case may include the upper case 405a, the lower case 405b, and at least one screw 450 coupling the upper case 405a with the lower case 405b. The contact structure 335a may be formed in the upper case 405a, and the contact structure 335b may be formed in the lower case 405b. For example, each of the contact structures 335a and 335b may include a protrusion.

The substrate may include a first substrate 105a, a second substrate 105b, and a support member 150 supporting the first substrate 105a and the second substrate 105b. The security pad 315a may be disposed in the first substrate 105a, and the security pad 315b may be disposed in the second substrate 105b. In exemplary embodiments of the inventive concept, the security pads 315a and 315b may include an adhesive composite.

When the upper case 405a and the lower case 405b are coupled by the screw 450 as illustrated in FIG. 11, the electrical connection between the security pads 315a and 315b and the contact structures 335a and 335b may be maintained.

When the upper case 405a and the lower case 405b are separated by loosening the screw 450 as illustrated in FIG. 12, the electrical connection between the security pads 315a and 315b and the contact structures 335a and 335b may be released. In this case, the secure erase process according to exemplary embodiments of the inventive concept may be performed.

In the example of FIGS. 11 and 12, only the security pads 315a and 315b may be added to a conventional or existing substrate, and/or at least one of the pads existing on the conventional substrate may be used as a security pad, and thus exemplary embodiments of the inventive concept may be efficiently implemented without additional elements and cost.

Figure 13:
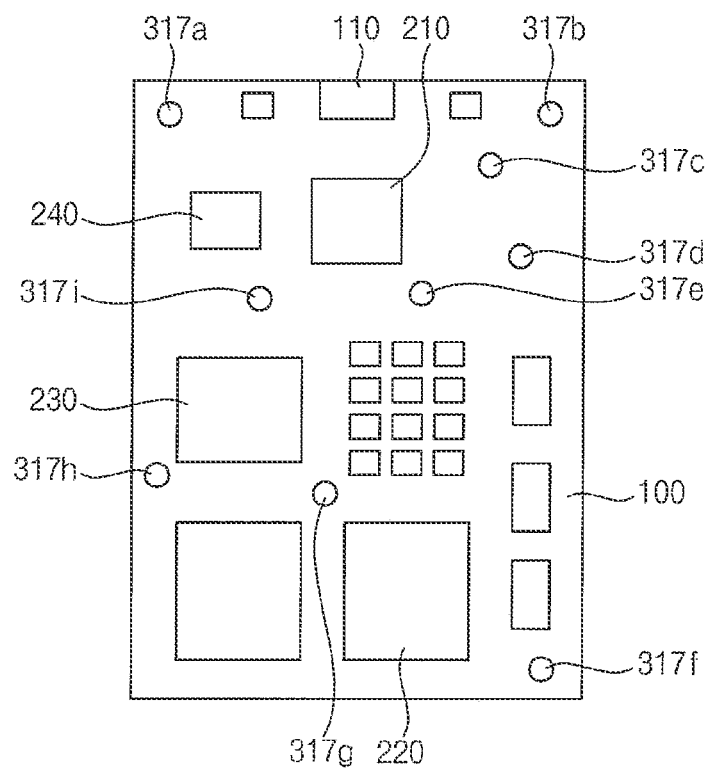
FIGS. 13, 14, and 15 are views of a security pad, a contact structure, and a sensing pin included in the storage device of FIG. 1 according to an exemplary embodiment of the inventive concept.
Figure 14:
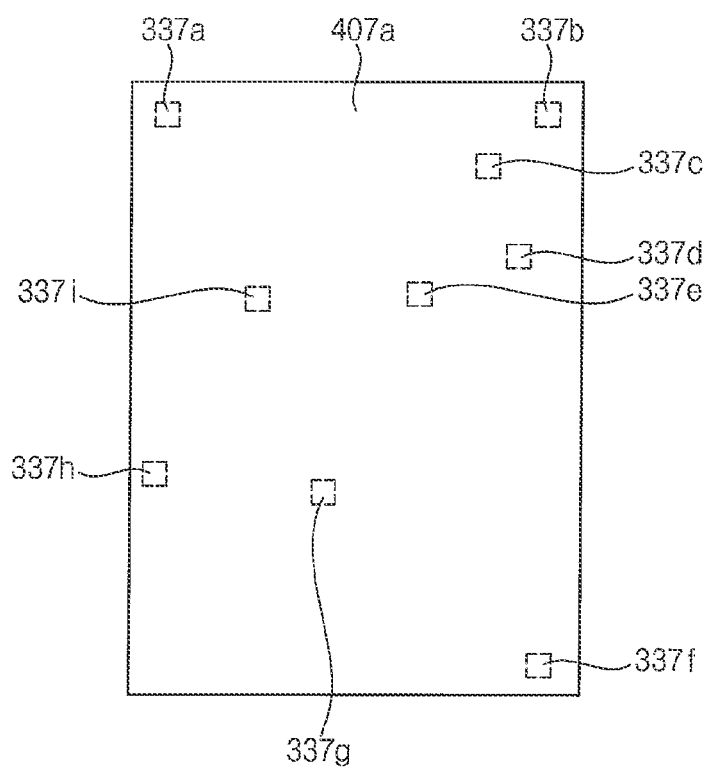
Figure 15:
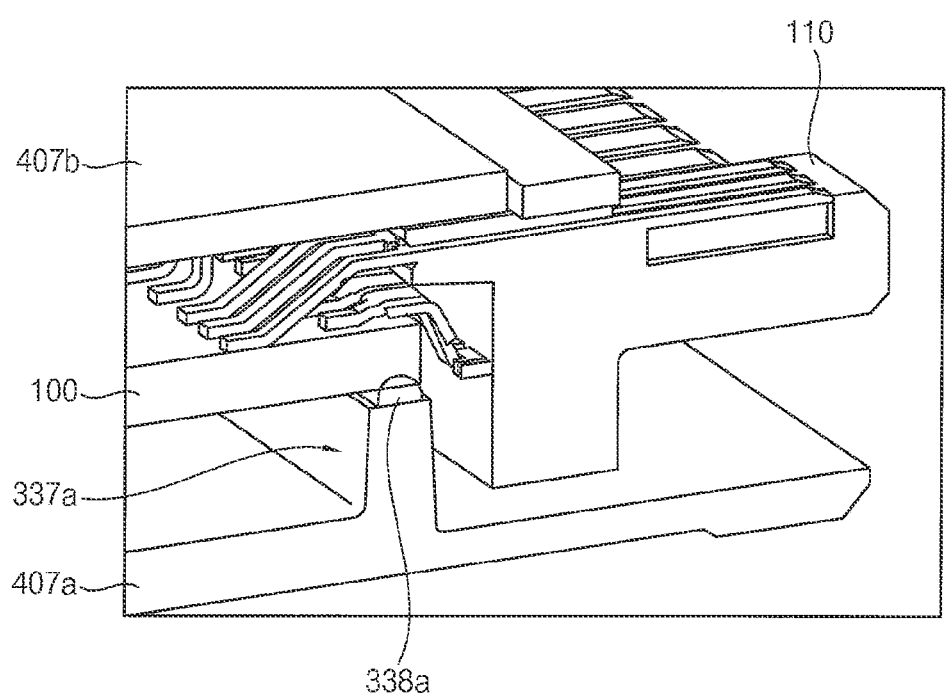

FIGS. 13, 14, and 15 are views of a security pad, a contact structure, and a sensing pin included in the storage device of FIG. 1 according to an exemplary embodiment of the inventive concept.

Referring to FIGS. 13, 14, and 15, the connector 110, the controller 210, the plurality of nonvolatile memories 220, the buffer memory 230, and the secure element 240 may be disposed on the substrate 100 similarly to that illustrated in FIG. 2. In addition, a plurality of security pads 317a, 317b, 317c, 317d, 317e, 317f, 317g, 317h, and 317i may be randomly disposed on the substrate 100. Each of the plurality of security pads 317a, 317b, 317c, 317d, 317e, 317f, 317g, 317h, and 317i may be similar to the security pad 311 in FIG. 5.

A plurality of protrusions 337a, 337b, 337c, 337d, 337e, 337f, 337g, 337h, and 337i may be formed in an upper case 407a to correspond to positions of the plurality of security pads 317a, 317b, 317c, 317d, 317e, 317f, 317g, 317h, and 317i. Positions of the plurality of protrusions 337a, 337b, 337c, 337d, 337e, 337f, 337g, 337h, and 337i may have a one-to-one correspondence with positions of the plurality of security pads 317a, 317b, 317c, 317d, 317e, 317f, 317g, 317h, and 317i. Each of the plurality of protrusions 337a, 337b, 337c, 337d, 337e, 337f, 337g, 337h, and 337i may be similar to the first protrusion 331 in FIG. 5.

In addition, a conductive polymer 338a may be formed on at least one of the plurality of protrusions 337a, 337b, 337c, 337d, 337e, 337f, 337g, 337h, and 337i to electrically contact at least one of the plurality of security pads 317a, 317b, 317c, 317d, 317e, 317f, 317g, 317h, and 317i. Although FIG. 15 illustrates only one conductive polymer 338a formed on the protrusion 337a and in electrical contact with the security pad 317a, the conductive polymer 338a may be formed on all of the plurality of protrusions 337a, 337b, 337c, 337d, 337e, 337f, 337g, 337h, and 337i. Similar to exemplary embodiments described above, the substrate 100 may be mounted on a lower case 407b that is opposite to the upper case 407a.

In other words, in the example of FIGS. 13, 14, and 15, the security pad formed in the substrate 100 may include the plurality of security pads 317a, 317b, 317c, 317d, 317e, 317f, 317g, 317h, and 317i, and the contact structure formed in the upper case 407a may include the plurality of protrusions 337a, 337b, 337c, 337d, 337e, 337f, 337g, 337h, and 337i, and the conductive polymer 338a.

As an example, when the conductive polymer 338a does not electrically contact at least one of the plurality of security pads 317a, 317b, 317c, 317d, 317e, 317f, 317g, 317h, and 317i, a secure erase process may be performed. The secure erase process may be performed to erase data stored in at least one the plurality of nonvolatile memories 220 and the secure element 240. Similar to as described above, the plurality of nonvolatile memories 220 and the secure element 240 may be referred to as a data storage element.

In exemplary embodiments of the inventive concept, the upper case 407a may be manufactured using a die-casting process. For example, in the die-casting process, the plurality of protrusions 337a, 337b, 337c, 337d, 337e, 337f, 337g, 337h, and 337i may be formed by forming security bumps or walls (e.g., by cutting or perforating the case), and the conductive polymer 338a may be formed using a liquid electric polymer (e.g., form-in-place-gasket (FIPG)). In other words, a liquid FIPG mass production structure may be applied to the upper case 407a.

In exemplary embodiments of the inventive concept, the storage device may be implemented by combining two or more of the examples described with reference to FIGS. 5 through 15. For example, the storage device may include a plurality of physical sensing structures. For example, since one security pad-contact structure pair forms one physical sensing structure as described above, a first physical sensing structure among the plurality of physical sensing structures may be implemented as one of the examples of FIGS. 5, 7, and 8, a second physical sensing structure among the plurality of physical sensing structures may be implemented as one of the examples of FIGS. 9 and 10, a third physical sensing structure among the plurality of physical sensing structures may be implemented as the example of FIGS. 11 and 12, and a fourth physical sensing structure among the plurality of physical sensing structures may be implemented as the example of FIGS. 13, 14, and 15.

FIGS. 16A, 16B, 17A, 17B, 18A, and 18B are diagrams for describing a secure erase process performed by the storage device of FIG. 1 according to exemplary embodiments of the inventive concept.

Figure 16A:
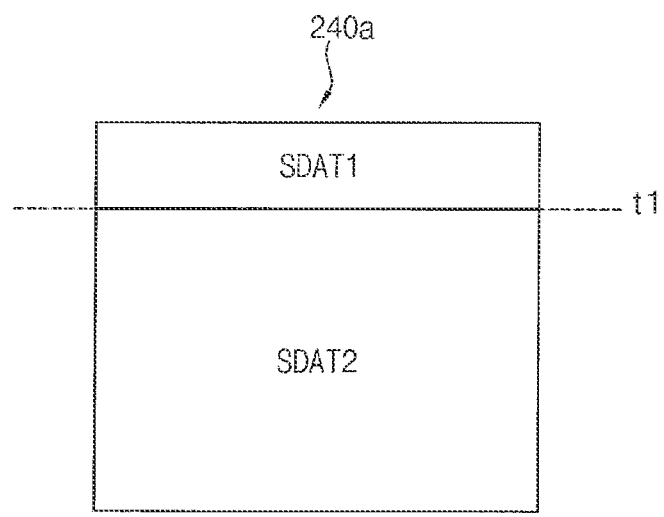
FIGS. 16A, 16B, 17A, 17B, 18A, and 18B are diagrams for describing a secure erase process performed by the storage device of FIG. 1 according to exemplary embodiments of the inventive concept.
Figure 16B:
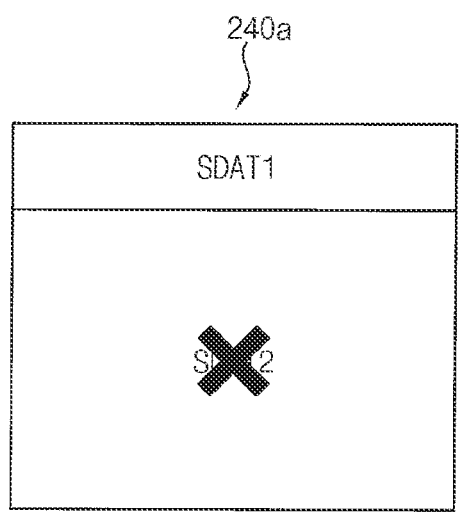

Referring to FIGS. 16A and 16B, secure data SDAT1 and SDAT2 may be stored in a secure element 240a. For example, the secure data SDAT1 may be data stored at an initial operation time, e.g., before a first time point t1, and the secure data SDAT2 may be data stored after the first time point t1. For example, the secure data SDAT1 may be data for initial setup, and the secure data SDAT2 may be user data stored by a user.

As illustrated in FIG. 16B, when the removal of the case is detected according to exemplary embodiments of the inventive concept described with reference to FIGS. 5 through 15 and then the secure erase process is performed, only the secure data SDAT2 stored after a specific time point (e.g., the first time point t1) may be permanently deleted, and the secure data SDAT1 stored before the specific time point (e.g., the first time point t1) may be maintained without being deleted. Thus, the secure element 240a may be used continuously.

Figure 17A:
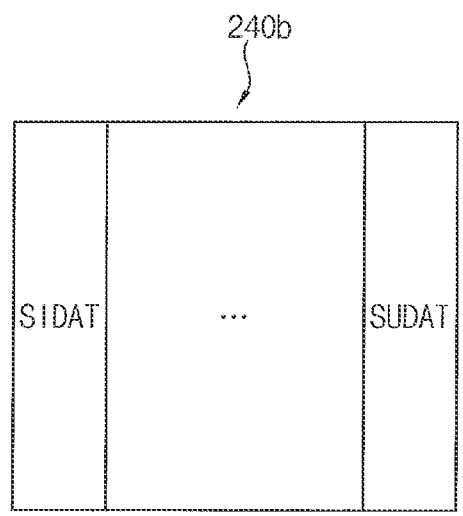
Figure 17B:
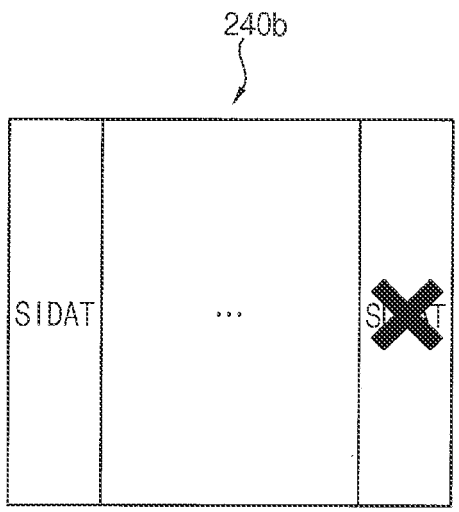

Referring to FIGS. 17A and 17B, secure data SIDAT and SUDAT may be stored in a secure element 240b. For example, the secure data SIDAT may be initial setting data stored by a manufacturer at the time of manufacturing the secure element 240b, and the secure data SUDAT may be user data stored by a user after the secure element 240b is provided to the user (or consumer).

As illustrated in FIG. 17B, when the removal of the case is detected according to exemplary embodiments of the inventive concept described with reference to FIGS. 5 through 15 and then the secure erase process is performed, only the secure data SUDAT stored by the user may be permanently deleted, and the secure data SIDAT not stored by the user may be maintained without being deleted. Thus, the secure element 240b may be used continuously.

Figure 18A:
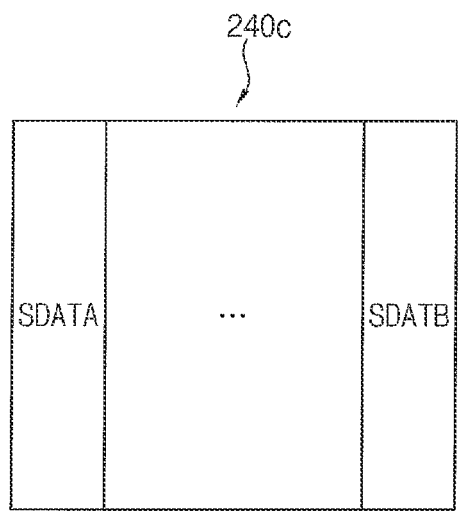
Figure 18B:
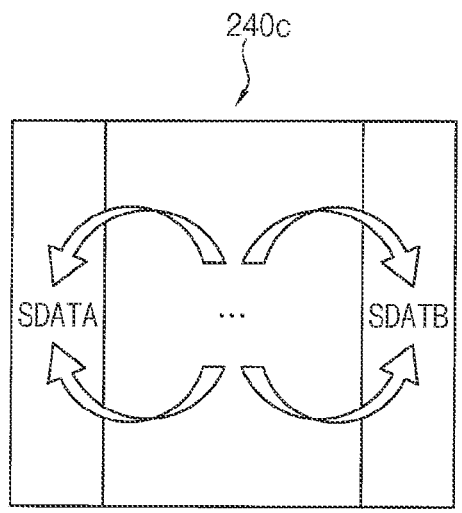

Referring to FIGS. 18A and 18B, secure data SDATA and SDATB may be stored in a secure element 240c. For example, the secure data SDATA and SDATB may be classified or divided according to the time of storage as described with reference to FIG. 16A, or according to the performer of storage as described with reference to FIG. 17A.

As illustrated in FIG. 18B, when the removal of the case is detected according to exemplary embodiments of the inventive concept described with reference to FIGS. 5 through 15 and then the secure erase process is performed, the secure data SDATA and SDATB may be randomly rearranged such that access to the secure data SDATA and SDATB is unavailable or impossible. In exemplary embodiments of the inventive concept, the access to the secure data SDATA and SDATB may be permanently unavailable, or the secure data SDATA and SDATB may be recovered and accessed using a security key provided by the manufacturer.

Although the examples of FIGS. 16A, 16B, 17A, 17B, 18A, and 18B are described based on secure data, the inventive concept is not limited thereto, and the secure erase process of FIGS. 16A, 16B, 17A, 17B, 18A, and 18B may also be performed on map data and/or user data stored in the nonvolatile memory.

Figure 19A:
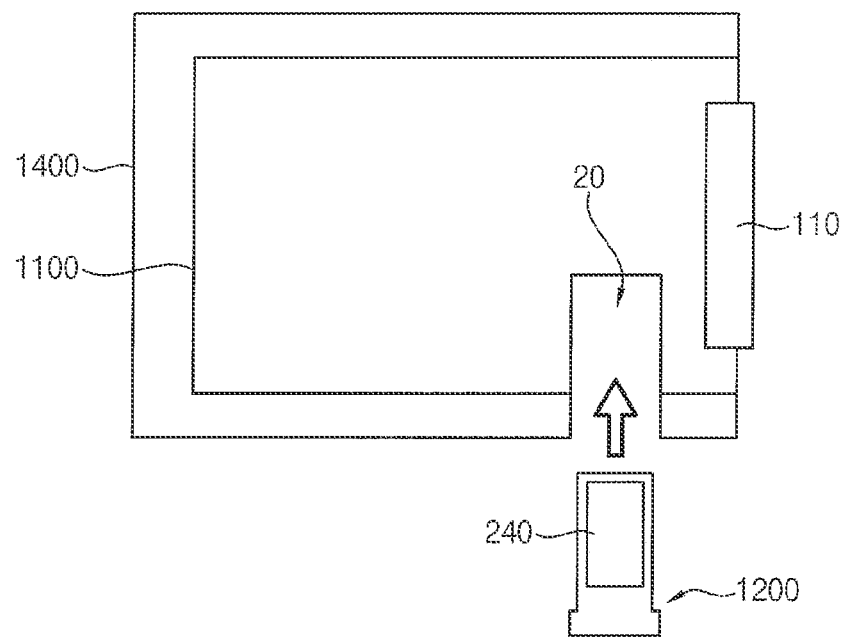
FIGS. 19A, 19B, and 19C are diagrams illustrating a secure element included in the storage device of FIG. 1 according to an exemplary embodiment of the inventive concept.
Figure 19B:
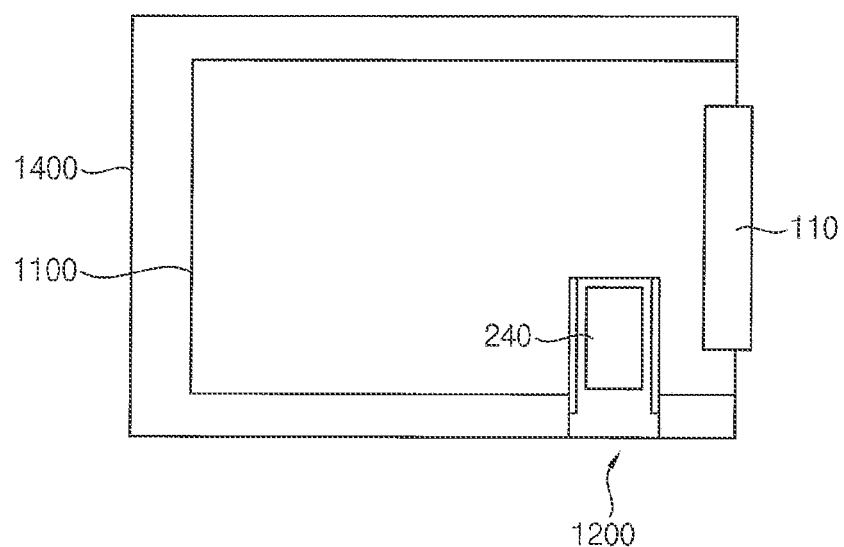
Figure 19C:
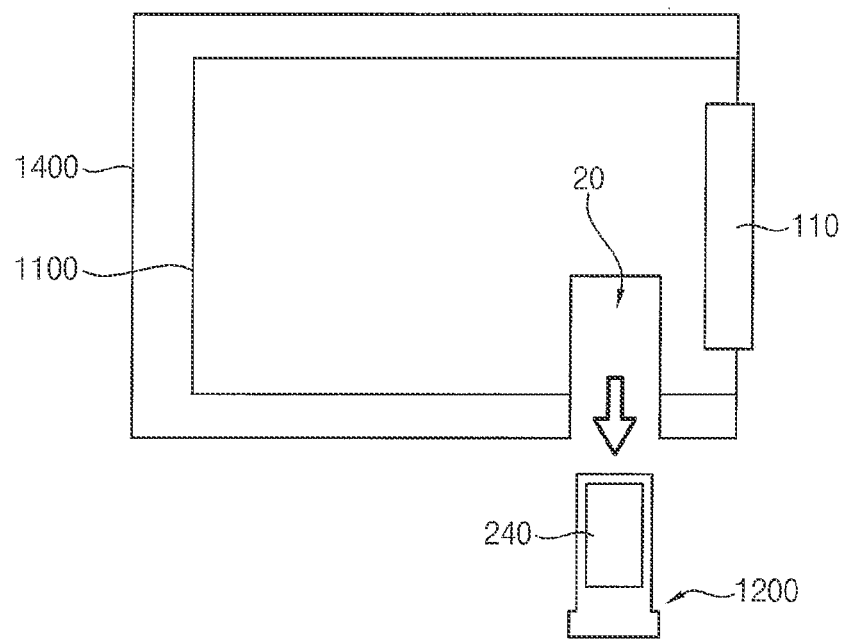

FIGS. 19A, 19B, and 19C are diagrams illustrating a secure element included in the storage device of FIG. 1 according to an exemplary embodiment of the inventive concept.

Referring to FIGS. 19A, 19B, and 19C, the secure element 240 may be formed to be electrically attachable to and detachable from a storage device 11. For example, the secure element 240 may be formed as an individual secure module

1200 and implemented separately from the storage device 11. The storage device 11 may include the connector 110, a substrate 1100, and a case 1400, and may further include a structure in the form of a slot 20 into which the secure module 1200 including the secure element 240 is inserted. The connector 110, the substrate 1100, and the case 1400 may correspond to the connector 110, the substrate 100, and the case 400 in FIG. 2, respectively.

As illustrated in FIGS. 19A and 19B, the secure module 1200 may be inserted into the slot 20 of the storage device 11. The storage device 11 may recognize the secure element 240 through an electrical connection with the secure module 1200, and may determine whether to execute the security function by performing an authentication process for accessing the secure element 240. For example, a serial number may be assigned to each of the storage device 11 (or the substrate 1100) and the secure element 240, and the security function may be executed only when the serial number of the storage device 11 and the serial number of the secure element 240 are identical to or matched with each other.

As illustrated in FIG. 19C, the secure module 1200 may be removed from the slot of the storage device 11. In this case, the secure data stored in the secure element 240 may be permanently deleted, or the secure data may be encrypted such that access to the secure data is unavailable.

In exemplary embodiments of the inventive concept, it may be detected whether the storage device 11 is connected to the external host device using one of a plurality of pins included in the connector 110, and an access to the storage device 11 and/or the secure element 240 may be blocked when the storage device 11 is not connected to the external host device.

Figure 20:
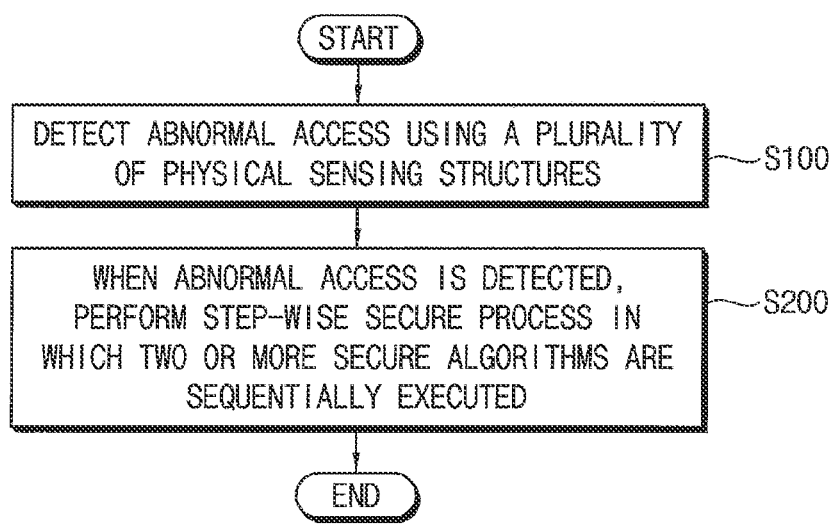
FIG. 20 is a flowchart illustrating a method of operating a storage device according to an exemplary embodiment of the inventive concept.

FIG. 20 is a flowchart illustrating a method of operating a storage device according to an exemplary embodiment of the inventive concept.

Referring to FIG. 20, in a method of operating a storage device according to exemplary embodiments of the inventive concept, an abnormal (or illegal) access to the storage device is detected using a plurality of physical sensing structures included in the storage device (operation S100). For example, the abnormal access may represent that at least a part of the case 400 is removed, separated, opened, or damaged for an illegal data debugging.

When the abnormal access to the storage device is detected using the plurality of physical sensing structures, a step-wise (or step-by-step) secure process, in which two or more secure algorithms associated with data stored in the storage device (e.g., for protecting the data stored in the storage device) are sequentially executed, is performed (operation S200). For example, the data may include at least one of secure data, map data, and user data. As will be described with reference to FIG. 21, the secure algorithms may correspond to different security levels, and the data may be processed differently and/or the secure algorithms for the data may be executed differently according to the security levels. As the above-described step-wise secure process is performed, the data may be efficiently eliminated or removed when it is detected that the case is opened or damaged.

The storage device according to exemplary embodiments of the inventive concept may include the plurality of physical sensing structures described with reference to FIGS. 5 through 15. In other words, the method of FIG. 20 may be applied to the storage device including two or more physical sensing structures, each of which includes one security pad-contact structure pair. For example, the storage device may include at least one security pad, at least one data storage element, at least one contact structure, and at least one sensing pin. The security pad and the contact structure may form at least one of the plurality of physical sensing structures. At least one of the secure algorithms may be performed based on an electrical signal. A level of the electrical signal may vary by detecting a change in a resistance according to whether the security pad is electrically connected to the contact structure.

Figure 21:
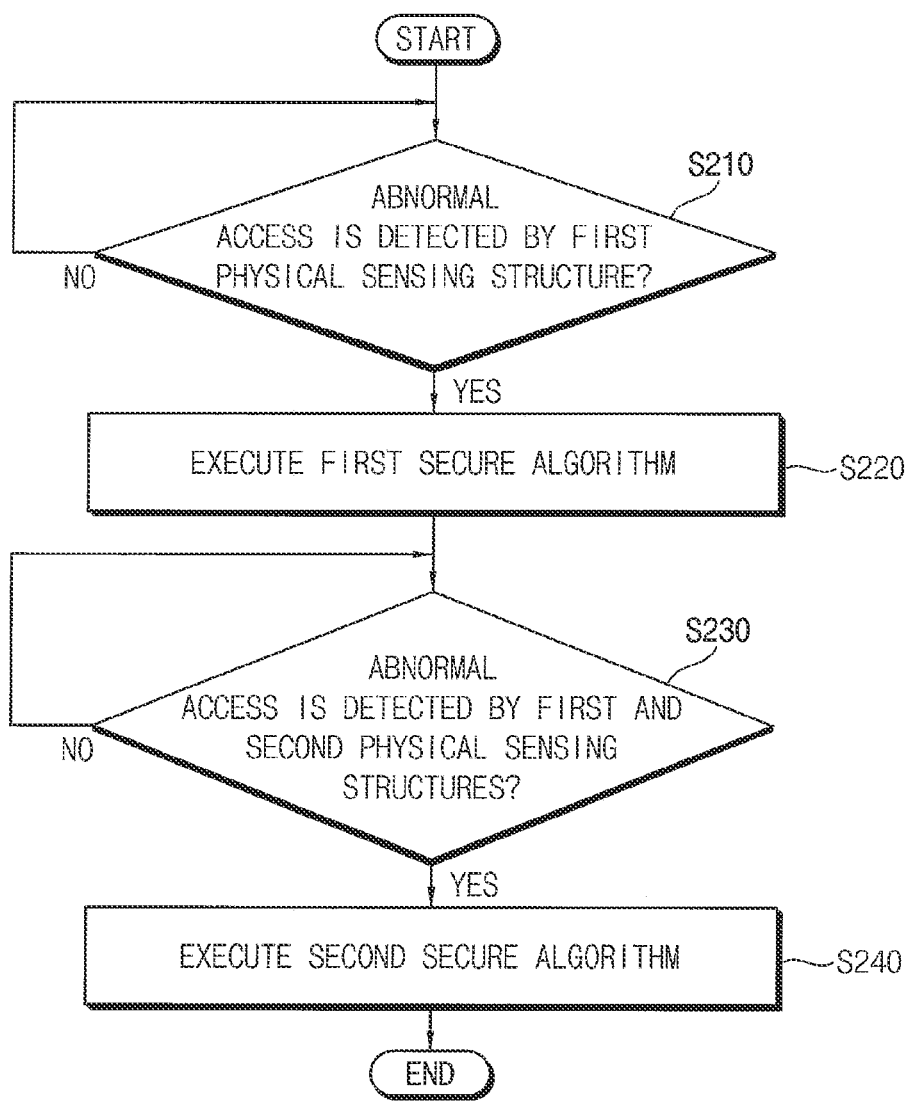
FIG. 21 is a flowchart illustrating an example of performing a step-wise secure process in FIG. 20 according to an exemplary embodiment of the inventive concept.

FIG. 21 is a flowchart illustrating an example of performing a step-wise secure process in FIG. 20 according to an exemplary embodiment of the inventive concept.

Referring to FIG. 21, an example of sequentially executing two secure algorithms, e.g., an example of performing a two-step secure process is illustrated.

When performing the step-wise secure process (operation S200), when the abnormal access is detected by a first physical sensing structure among the plurality of physical sensing structures (operation S210: YES), e.g., when the first physical sensing structure is damaged, a first secure algorithm may be executed (operation S220). The first secure algorithm may correspond to a relatively low security level. For example, the first secure algorithm may include an operation for blocking an access to the data while the data is maintained.

When the abnormal access is not detected (operation S210: NO), any follow-up actions may not be performed, and operation S210 may be repeated periodically and/or intermittently.

When the abnormal access is detected by the first physical sensing structure and a second physical sensing structure different from the first physical sensing structure among the plurality of physical sensing structures (operation S230: YES), e.g., when the second physical sensing structure is additionally damaged after the first physical sensing structure is damaged, a second secure algorithm may be executed (operation S240). The second secure algorithm may correspond to a relatively high security level. For example, the second secure algorithm may include an operation for permanently deleting the data.

When the abnormal access is not detected (operation S230: NO), operation S230 may be repeated periodically and/or intermittently after operation S220 is performed.

In exemplary embodiments of the inventive concept, the first secure algorithm may include the operation of randomly rearranging the secure data SDATA and SDATB described with reference to FIGS. 18A and 18B. In this case, the secure data SDATA and SDATB may be recovered and accessed using the security key provided by the manufacturer.

In exemplary embodiments of the inventive concept, the second secure algorithm may include the operation of permanently deleting the secure data SDAT2 stored after the specific time point (e.g., the first time point t1) described with reference to FIGS. 16A and 16B, and/or the operation of permanently deleting the secure data SUDAT stored by the user described with reference to FIGS. 17A and 17B.

Although FIG. 21 illustrates the two-step secure process, the inventive concept is not limited thereto, and exemplary embodiments of the inventive concept may be applied to an example where a secure process of three or more steps is performed, e.g., where three or more secure algorithms are sequentially executed. In this example, a secure process that corresponds to the highest security level and is performed last may include an operation for permanently deleting the data, similar to operation S240.

Figure 22:
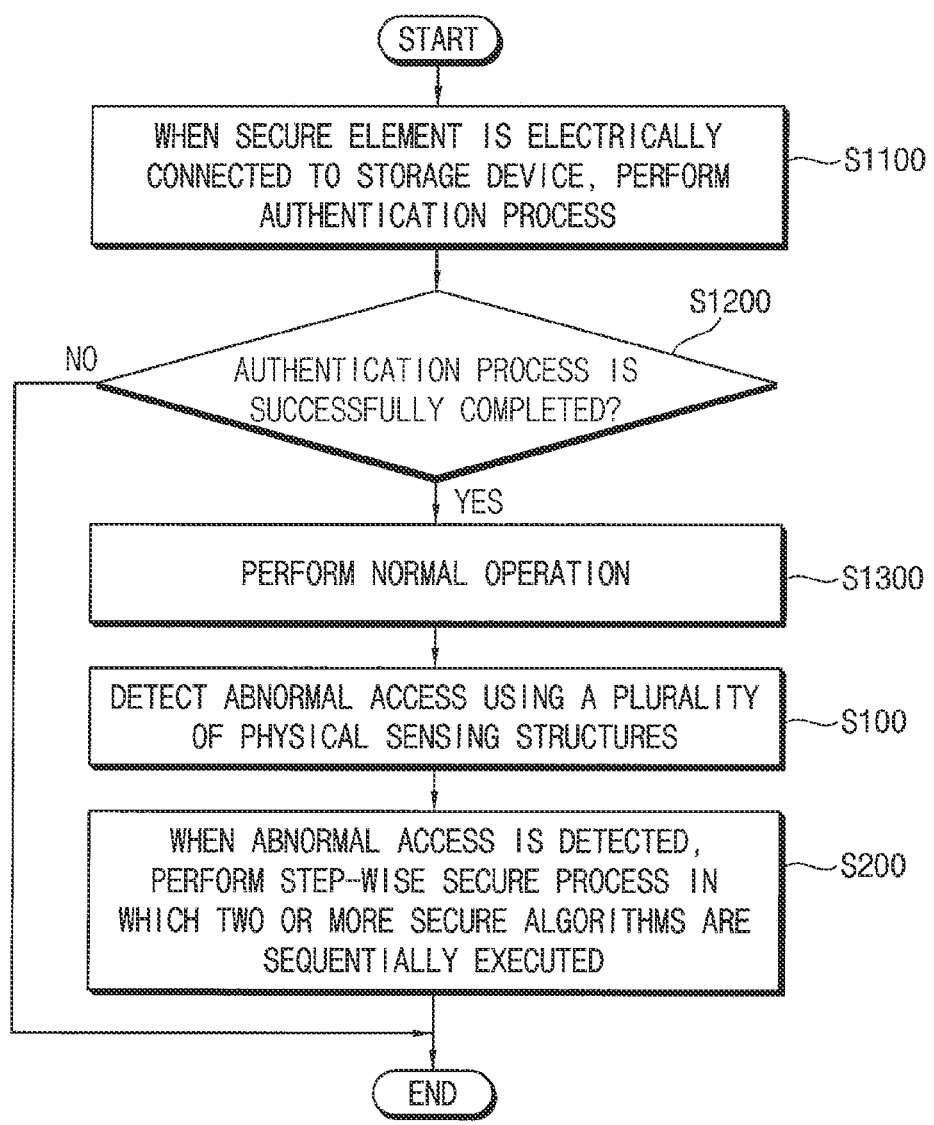
FIG. 22 is a flowchart illustrating a method of operating a storage device according to an exemplary embodiment of the inventive concept.

FIG. 22 is a flowchart illustrating a method of operating a storage device according to an exemplary embodiment of the inventive concept. The descriptions of elements already described with reference to FIG. 20 will be omitted.

Referring to FIG. 22, in a method of operating a storage device according to exemplary embodiments of the inventive concept, a secure element included in the storage device may be formed to be electrically attachable to and detachable from the storage device as described with reference to FIGS. 19A, 19B, and 19C.

When the secure element is electrically connected to the storage device, an authentication process for accessing the secure element may be performed (operation S1100). When the authentication process is successful or successfully completed (operation S1200: YES), a normal operation of accessing the secure element and the secure data may be performed (operation S1300). In other words, the secure data may be accessed only when the authentication process is successfully completed. When the authentication process is failed (operation S1200: NO), the method of operating the storage device according to exemplary embodiments of the inventive concept may be terminated.

Operations S100 and S200 performed after operation S1100 may be substantially the same as operations S100 and S200 in FIG. 20, respectively.

Figure 23:
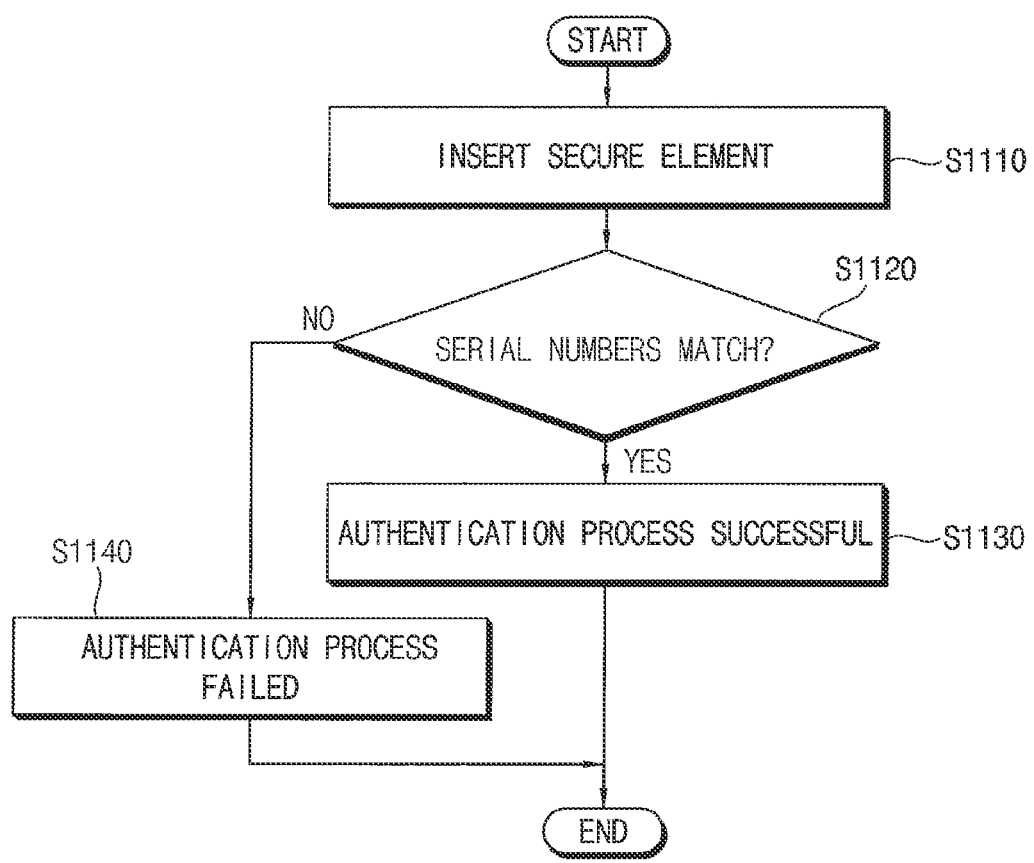
FIG. 23 is a flowchart illustrating an example of performing an authentication process in FIG. 22 according to an exemplary embodiment of the inventive concept.

FIG. 23 is a flowchart illustrating an example of performing an authentication process in FIG. 22 according to an exemplary embodiment of the inventive concept.

Referring to FIG. 23, when performing the authentication process (operation S1100), the secure element may be inserted into a slot of the storage device (operation S1110), and a serial number of the storage device or a substrate included in the storage device may be compared with a serial number of the secure element. The serial number may be assigned at the time of manufacture and may be stored in advance.

When the serial numbers match (operation S1120: YES), it may be determined that the authentication process is successful (operation S1130). When the serial numbers do not match (operation S1120: NO), it may be determined that the authentication process is failed (operation S1140).

Figure 24:
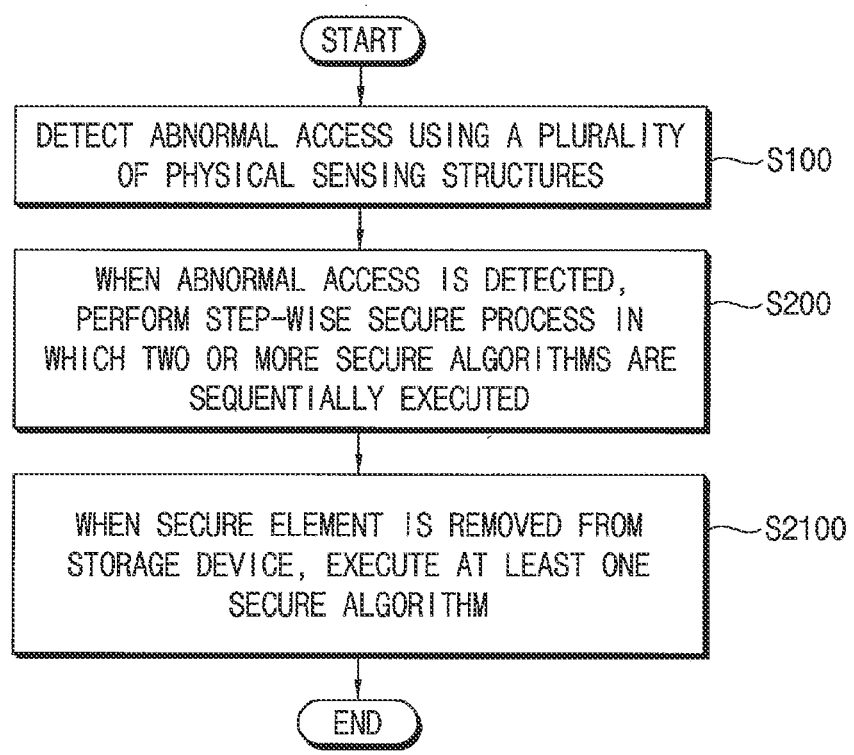
FIG. 24 is a flowchart illustrating a method of operating a storage device according to an exemplary embodiment of the inventive concept.

FIG. 24 is a flowchart illustrating a method of operating a storage device according to an exemplary embodiment of the inventive concept. The descriptions of elements already described with reference to FIGS. 20 and 22 will be omitted.

Referring to FIG. 24, in a method of operating a storage device according to exemplary embodiments of the inventive concept, a secure element included in the storage device may be formed to be electrically attachable to and detachable from the storage device as described with reference to FIGS. 19A, 19B, and 19C.

FIG. 24 illustrates an operation after the secure element is electrically connected to the storage device. Operations S1100, S1200, and S1300 in FIG. 22 may be performed before operation S100 of FIG. 24. Operations S100 and S200 in FIG. 24 may be substantially the same as operations S100 and S200 in FIG. 20, respectively.

When the secure element is removed from the storage device, at least one of the secure algorithms may be performed (operation S2100). For example, the operation for blocking the access to the data (e.g., encryption), the operation for permanently deleting the data, or the like may be performed.

As will be appreciated by those skilled in the art, the inventive concept may be embodied as a system, method, computer program product, and/or a computer program product embodied in one or more computer readable medium(s) having computer readable program code embodied thereon. The computer readable program code may be provided to a processor of a general purpose computer, special purpose computer, or other programmable data processing apparatus. The computer readable medium may be a computer readable signal medium or a computer readable storage medium. The computer readable storage medium may be any tangible medium that can contain or store a program for use by or in connection with an instruction execution system, apparatus, or device. For example, the computer readable medium may be a non-transitory computer readable medium.

Figure 25:
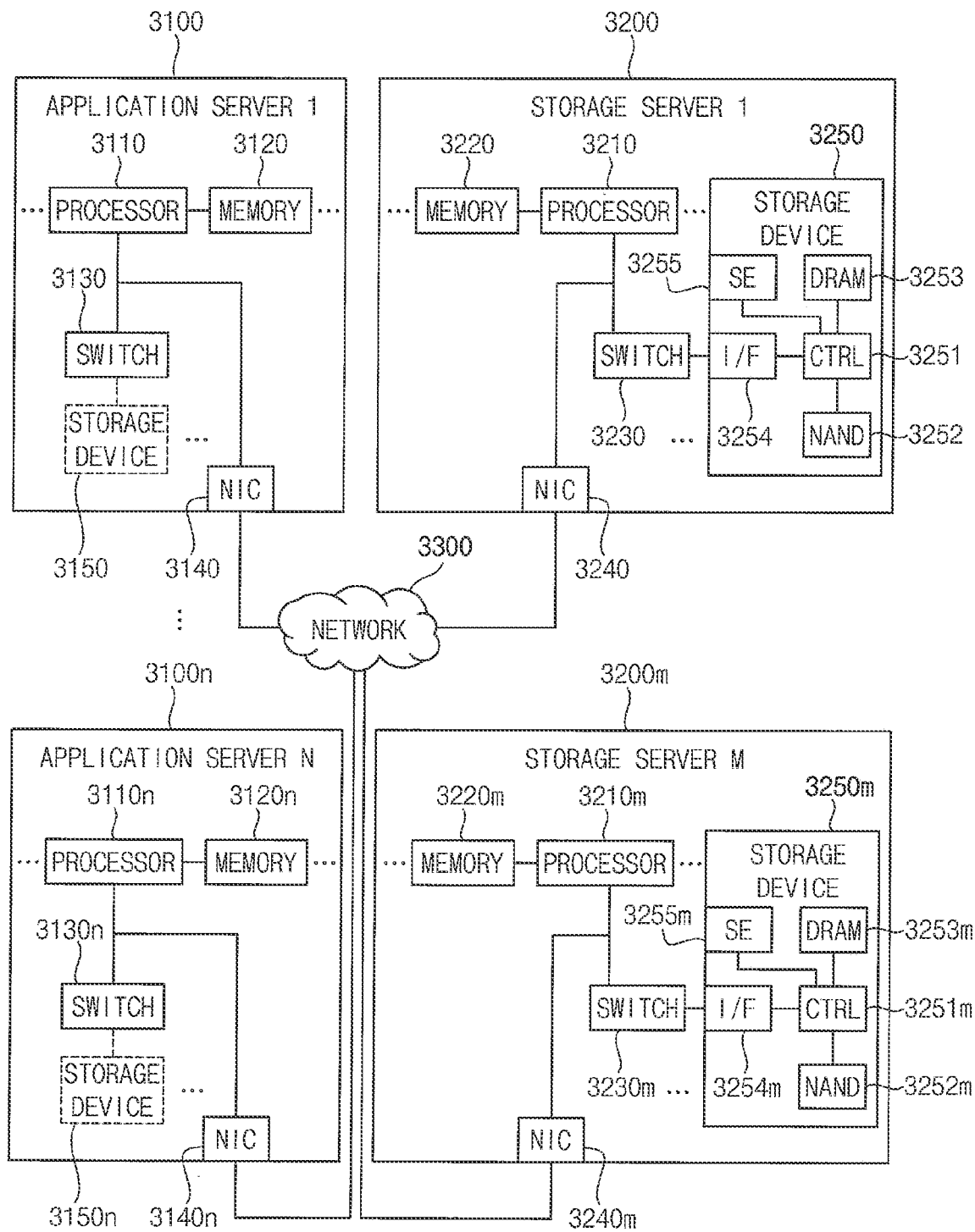
FIG. 25 is a block diagram illustrating a data center including a storage device according to an exemplary embodiment of the inventive concept.

FIG. 25 is a block diagram illustrating a data center including a storage device according to an exemplary embodiment of the inventive concept.

Referring to FIG. 25, a data center 3000 may be a facility that collects various types of data and provides various services, and may be referred to as a data storage center. The data center 3000 may be a system for operating search engines and databases, and may be a computing system used by companies such as banks or government agencies. The data center 3000 may include application servers 3100 to 3100$n$ and storage servers 3200 to 3200$m$. The number of the application servers 3100 to 3100$n$ and the number of the storage servers 3200 to 3200$m$ may be variously selected according to exemplary embodiments of the inventive concept, and the number of the application servers 3100 to 3100$n$ and the number of the storage servers 3200 to 3200$m$ may be different from each other.

The application server 3100 may include at least one processor 3110 and at least one memory 3120, and the storage server 3200 may include at least one processor 3210 and at least one memory 3220. An operation of the storage server 3200 will be described as an example. The processor 3210 may control overall operations of the storage server 3200, and may access the memory 3220 to execute instructions and/or data loaded in the memory 3220. The memory 3220 may include at least one of a double data rate (DDR) synchronous dynamic random access memory (SDRAM), a high bandwidth memory (HBM), a hybrid memory cube (HMC), a dual in-line memory module (DIMM), an Optane DIMM, a nonvolatile DIMM (NVDIMM), etc. The number of the processors 3210 and the number of the memories 3220 included in the storage server 3200 may be variously selected according to exemplary embodiments of the inventive concept. In exemplary embodiments of the inventive concept, the processor 3210 and the memory 3220 may provide a processor-memory pair. In exemplary embodiments of the inventive concept, the number of the processors 3210 and the number of the memories 3220 may be different from each other. The processor 3210 may include a single core processor or a multiple core processor.

The above description of the storage server 3200 may be similarly applied to the application server 3100. The application server 3100 may include at least one storage device 3150, and the storage server 3200 may include at least one storage device 3250. In exemplary embodiments of the inventive concept, the application server 3100 may not include the storage device 3150. The number of the storage devices 3250 included in the storage server 3200 may be variously selected according to exemplary embodiments of the inventive concept.

The application servers 3100 to 3100$n$ and the storage servers 3200 to 3200$m$ may communicate with each other through a network 3300. The network 3300 may be implemented using a fiber channel (FC) or an Ethernet. The FC may be a medium used for a relatively high speed data transmission, and an optical switch that provides high performance and/or high availability may be used. The storage servers 3200 to 3200*m* may be provided as file storages, block storages, or object storages according to an access scheme of the network 3300.

In exemplary embodiments of the inventive concept, the network 3300 may be a storage-only network or a network dedicated to storage such as a storage area network (SAN). For example, the SAN may be an FC-SAN that uses an FC network and is implemented according to an FC protocol (FCP). As another example, the SAN may be an IP-SAN that uses a transmission control protocol/internet protocol (TCP/IP) network and is implemented according to an iSCSI (a SCSI over TCP/IP or an Internet SCSI) protocol. In exemplary embodiments of the inventive concept, the network 3300 may be a general or normal network such as the TCP/IP network. For example, the network 3300 may be implemented according to at least one of protocols such as an FC over Ethernet (FCoE), a network attached storage (NAS), a nonvolatile memory express (NVMe) over Fabrics (NVMe-oF), etc.

Hereinafter, exemplary embodiments of the inventive concept will be described based on the application server 3100 and the storage server 3200. The description of the application server 3100 may be applied to the other application server 3100*n*, and the description of the storage server 3200 may be applied to the other storage server 3200*m*.

The application server 3100 may store data requested to be stored by a user or a client into one of the storage servers 3200 to 3200*m* through the network 3300. In addition, the application server 3100 may obtain data requested to be read by the user or the client from one of the storage servers 3200 to 3200*m* through the network 3300. For example, the application server 3100 may be implemented as a web server or a database management system (DBMS).

The application server 3100 may access a memory 3120*n* or a storage device 3150*n* included in the other application server 3100*n* through the network 3300, and/or may access the memories 3220 to 3220*m* or the storage devices 3250 to 3250*m* included in the storage servers 3200 to 3200*m* through the network 3300. Thus, the application server 3100 may perform various operations on data stored in the application servers 3100 to 3100*n* and/or the storage servers 3200 to 3200*m*. For example, the application server 3100 may execute a command for moving or copying data between the application servers 3100 to 3100*n* and/or the storage servers 3200 to 3200*m*. The data may be transferred from the storage devices 3250 to 3250*m* of the storage servers 3200 to 3200*m* to the memories 3120 to 3120*n* of the application servers 3100 to 3100*n* directly or through the memories 3220 to 3220*m* of the storage servers 3200 to 3200*m*. For example, the data transferred through the network 3300 may be encrypted data for security or privacy.

In the storage server 3200, an interface 3254 may provide a physical connection between the processor 3210 and a controller 3251, and/or a physical connection between a network interface card (NIC) 3240 and the controller 3251. For example, the interface 3254 may be implemented based on a direct attached storage (DAS) scheme in which the storage device 3250 is directly connected with a dedicated cable. For example, the interface 3254 may be implemented based on at least one of various interface schemes such as an advanced technology attachment (ATA), a serial ATA (SATA), an external SATA (e-SATA), a small computer system interface (SCSI), a serial attached SCSI (SAS), a peripheral component interconnect (PCI), a PCI express (PCIe), an NVMe, an IEEE 1394, a universal serial bus (USB), a secure digital (SD) card interface, a multimedia card (MMC) interface, an embedded MMC (eMMC) interface, a universal flash storage (UFS) interface, an embedded UFS (eUFS) interface, a compact flash (CF) card interface, etc. Similarly, the storage server 3200*m* may include an interface 3254*m*.

The storage server 3200 may further include a switch 3230 and the NIC 3240. The switch 3230 may selectively connect the processor 3210 with the storage device 3250 or may selectively connect the NIC 3240 with the storage device 3250 under a control of the processor 3210. Similarly, the application server 3100 may further include a switch 3130 and an NIC 3140. Likewise, the storage server 3200*m* may include a switch 3230*m* and an NIC 3240*m*, and the application server 3100*n* may include a switch 3130*n* and an NIC 3140*n*.

In exemplary embodiments of the inventive concept, the NIC 3240 may include a network interface card, a network adapter, or the like. The NIC 3240 may be connected to the network 3300 through a wired interface, a wireless interface, a Bluetooth interface, an optical interface, or the like. The NIC 3240 may further include an internal memory, a digital signal processor (DSP), a host bus interface, or the like, and may be connected to the processor 3210 and/or the switch 3230 through the host bus interface. The host bus interface may be implemented as one of the above-described examples of the interface 3254. In exemplary embodiments of the inventive concept, the NIC 3240 may be integrated with at least one of the processor 3210, the switch 3230, and the storage device 3250.

In the storage servers 3200 to 3200*m* and/or the application servers 3100 to 3100*n*, the processor (e.g., 3110, 3210, 3110*n*, or 3210*m*) may transmit a command to the storage devices 3150 to 3150*n* and 3250 to 3250*m* or the memories 3120 to 3120*n* and 3220 to 3220*m* to program or read data. For example, the data may be error-corrected data by an error correction code (ECC) engine. For example, the data may be processed by a data bus inversion (DBI) or a data masking (DM), and may include cyclic redundancy code (CRC) information. For example, the data may be encrypted data for security or privacy.

The storage devices 3150 to 3150*m* and 3250 to 3250*m* may transmit a control signal and command/address signals to NAND flash memory devices 3252 to 3252*m* in response to a read command received from the processor. When data is read from the NAND flash memory devices 3252 to 3252*m*, a read enable (RE) signal may be input as a data output control signal and may serve to output data to a DQ bus. A data strobe signal (DQS) may be generated using the RE signal. The command and address signals may be latched in a page buffer based on a rising edge or a falling edge of a write enable (WE) signal.

The controller 3251 may control overall operations of the storage device 3250. In exemplary embodiments of the inventive concept, the controller 3251 may include a static random access memory (SRAM). The controller 3251 may write data into the NAND flash memory device 3252 in response to a write command, or may read data from the NAND flash memory device 3252 in response to a read command. For example, the write command and/or the read command may be provided from the processor 3210 in the storage server 3200, the processor 3210*m* in the other storage server 3200*m*, or the processors 3110 to 3110*n* in the application servers 3100 to 3100*n*. A DRAM 3253 may temporarily store (e.g., may buffer) data to be written to the NAND flash memory device 3252 or data read from the NAND flash memory device 3252. Further, the DRAM 3253 may store meta data. The meta data may be data generated by the controller 3251 to manage user data or the NAND flash memory device 3252. The storage device 3250 may include a secure element 3255 for security or privacy.

Similar to the controller 3251, a controller 3251m may control overall operations of the storage device 3250m. Likewise, a DRAM 3253m and a secure element 3255m of the storage device 3250m may perform functions similar to those of the DRAM 3253 and the secure element 3255, respectively.

Each of the storage devices 3150 to 3150m and 3250 to 3250m may be the storage device according to exemplary embodiments of the inventive concept described with reference to FIGS. 1 through 19, and may perform the method according to exemplary embodiments of the inventive concept described with reference to FIGS. 20 through 24.

Figure 26:
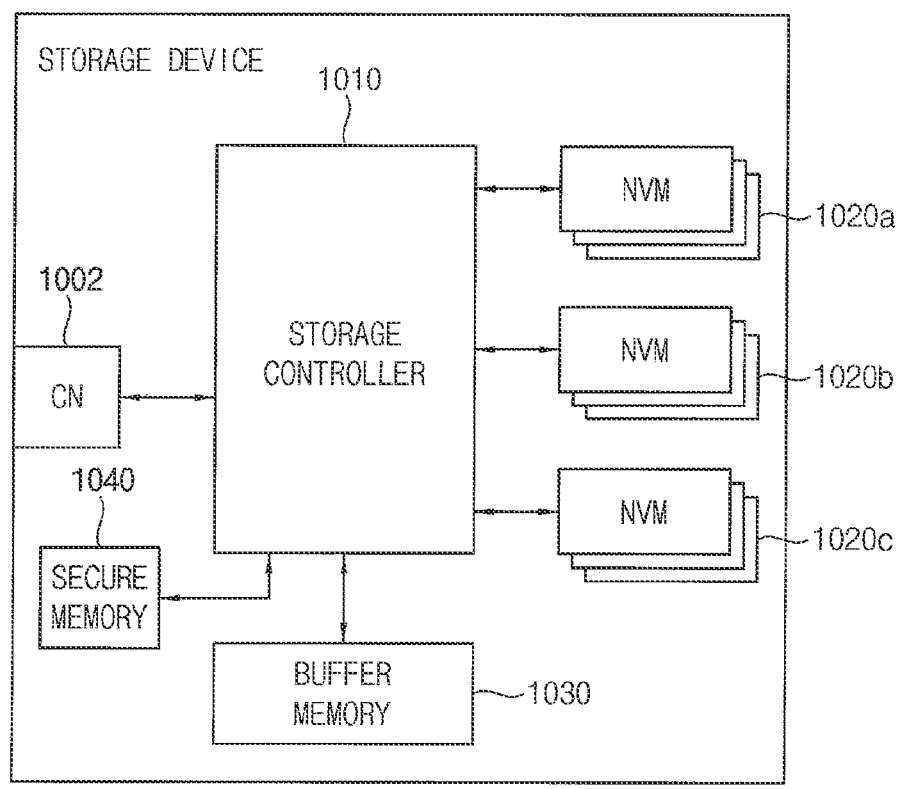
FIGS. 26 and 27 are block diagrams illustrating a storage device included in the data center of FIG. 25 according to exemplary embodiments of the inventive concept.
Figure 27:
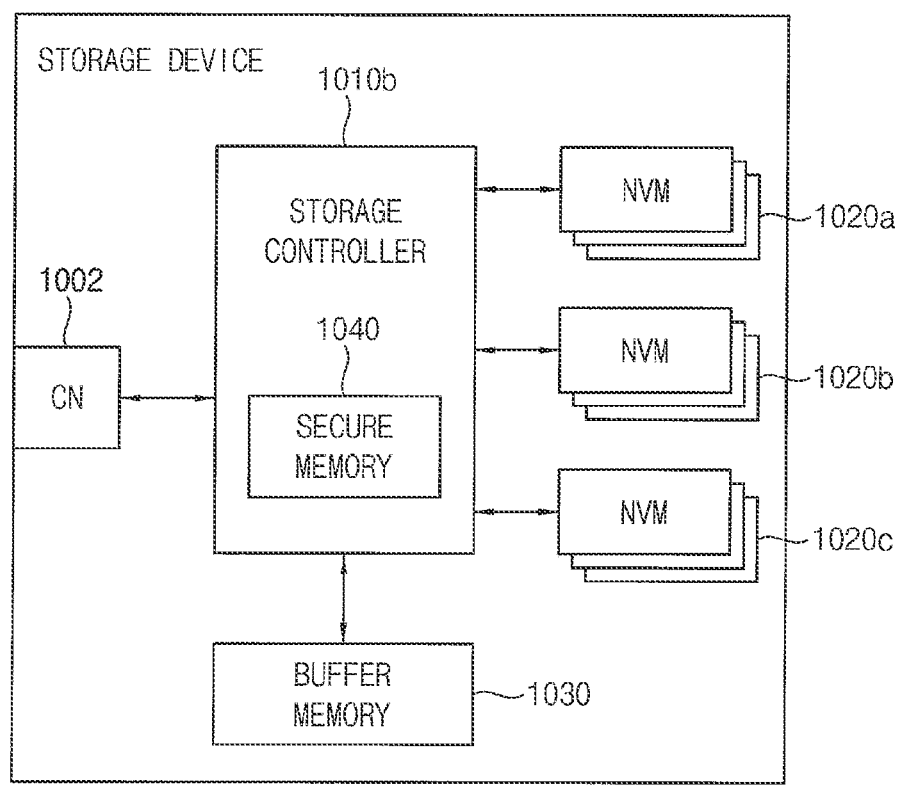

FIGS. 26 and 27 are block diagrams illustrating a storage device included in the data center of FIG. 25 according to exemplary embodiments of the inventive concept.

Referring to FIG. 26, a storage device 1000a may include a connector 1002, a storage controller 1010, a plurality of nonvolatile memories 1020a, 1020b, and 1020c, a buffer memory 1030, and a secure memory 1040.

The connector 1002, the storage controller 1010, the plurality of nonvolatile memories 1020a, 1020b, and 1020c, the buffer memory 1030, and the secure memory 1040 may correspond to the connector 110, the controller 210, the plurality of nonvolatile memories 220, the buffer memory 230, and the secure element 240 in FIG. 2, respectively.

In the example of FIG. 26, the secure memory 1040 may be formed as an individual chip separated from the storage controller 1010 and the plurality of nonvolatile memories 1020a, 1020b, and 1020c.

Referring to FIG. 27, a storage device 1000b may include a connector 1002, a storage controller 1010b, a plurality of nonvolatile memories 1020a, 1020b, and 1020c, a buffer memory 1030, and a secure memory 1040. The storage device 1000b may be substantially the same as the storage device 1000a of FIG. 26, except that the secure memory 1040 is disposed or included in the storage controller 1010b.

In the example of FIG. 27, the secure memory 1040 may be integrated with the storage controller 1010b to form a single chip. According to an exemplary embodiment of the inventive concept, the secure memory 1040 may be integrated with one of the plurality of nonvolatile memories 1020a, 1020b, and 1020c to form a single chip.

Figure 28:
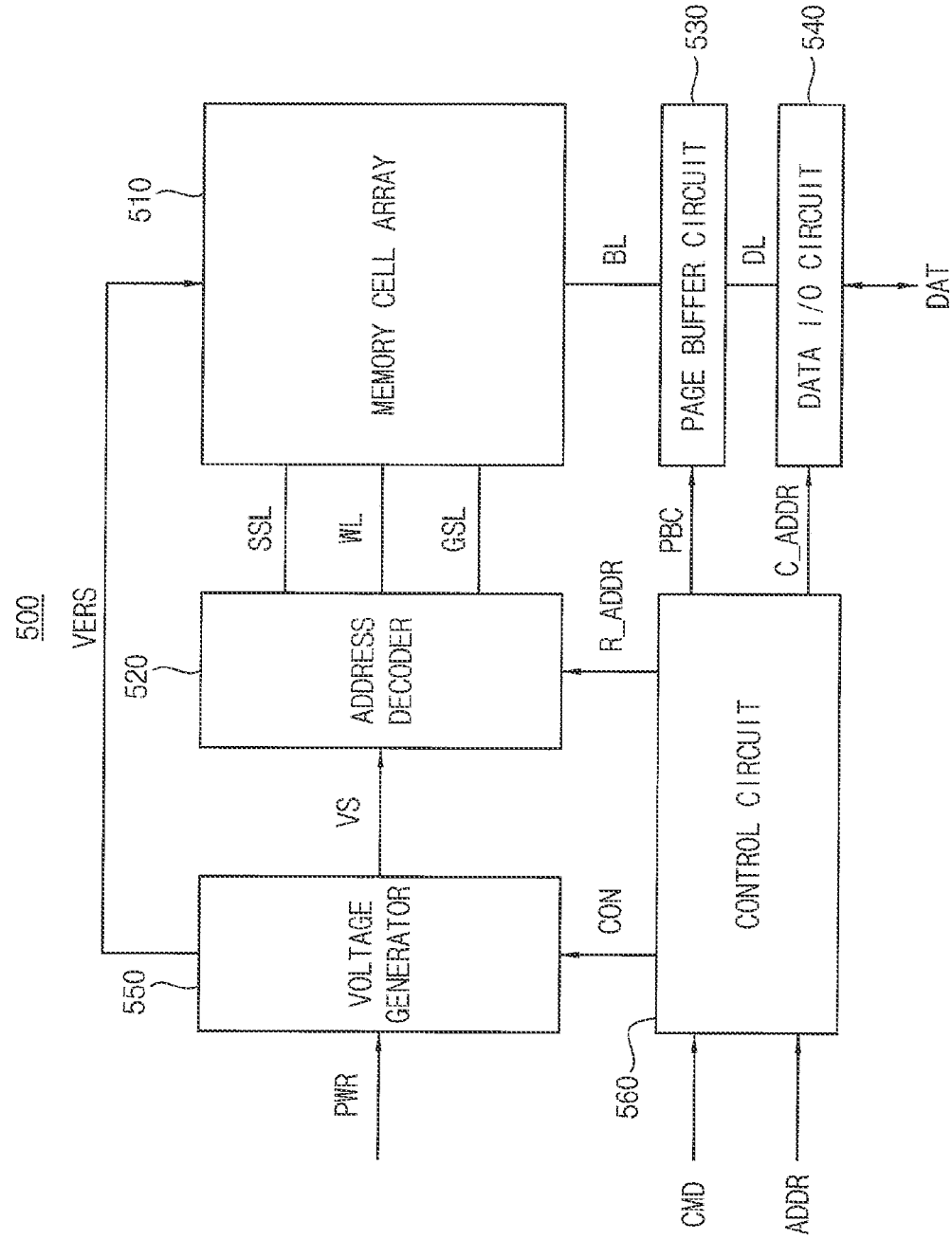
FIG. 28 is a block diagram illustrating a memory included in the storage device of FIG. 26 or FIG. 27 according to an exemplary embodiment of the inventive concept.

FIG. 28 is a block diagram illustrating a memory included in the storage device of FIG. 26 or FIG. 27 according to an exemplary embodiment of the inventive concept.

Referring to FIG. 28, a memory 500 includes a memory cell array 510, an address decoder 520, a page buffer circuit 530, a data input/output (I/O) circuit 540, a voltage generator 550, and a control circuit 560. The memory 500 may be one of the plurality of nonvolatile memories 1020a, 1020b, and 1020c in FIGS. 26 and 27, or may be the secure memory 1040 in FIGS. 26 and 27.

The memory cell array 510 may include a plurality of memory cells that store data. The control circuit 560 may control an operation of the memory 500 based on a command CMD and an address ADDR. The control circuit 560 may also transmit a row address R_ADDR to the address decoder 520, a column address C_ADDR to the data I/O circuit 540, and a page buffer control signal PBC to the page buffer circuit 530. The address decoder 520 may be connected to the memory cell array 510 through a plurality of string selection lines SSL, a plurality of wordlines WL, and a plurality of ground selection lines GSL. The voltage generator 550 may generate voltages VS and VERS for the operation of the memory 500 based on a power voltage PWR and control signals CON. The page buffer circuit 530 may be connected to the memory cell array 510 through a plurality of bitlines BL. The data I/O circuit 540 may be connected to the page buffer circuit 530 through data lines DL, and may receive write data DAT or output read data DAT.

The voltage VERS may be an erase voltage VERS. The secure erase process according to exemplary embodiments of the inventive concept may be performed using the erase voltage VERS.

The inventive concept may be applied to various electronic devices and/or systems including storage devices and/or SSD devices. For example, the inventive concept may be applied to systems such as a personal computer (PC), a server computer, a data center, a workstation, a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, etc.

In the storage device, the SSD device, and the data center according to exemplary embodiments of the inventive concept, the security pad in the substrate and the contact structure in the case may be formed or provided. When at least part of the case is removed, it may be detected whether the security pad and the contact structure are in electrical contact, and the secure erase process for permanently deleting the data may be performed. Accordingly, in the event of theft, loss, or disuse of the storage device, the data may be efficiently eliminated for improving or enhancing the security performance, and thus the leakage of the data may be prevented or the data may be confirmed as end of use by the user. The electrical elements may be reused because the electrical elements are not destroyed, and only a secure data area may be selectively deleted, and a storage medium, which includes a normal data area, may continue to be used.

In the method of operating the storage device according to exemplary embodiments of the inventive concept, the stepwise secure process may be performed, and thus the data may be efficiently eliminated or removed when it is detected that the case is opened or damaged.

While the inventive concept has been shown and described with reference to exemplary embodiments thereof, it will be apparent to those of ordinary skill in the art that various changes in form and details may be made thereto without departing from the spirit and scope of the inventive concept as set forth by the appended claims.

What is claimed is:

1. A storage device comprising:
a processor;
a substrate including at least one security pad;
at least one data storage element mounted on the substrate, and including at least one nonvolatile memory including a normal data area configured to store normal data and at least one secure memory including a secure data area configured to store secure data;
a case surrounding the substrate and the at least one data storage element and including at least one contact structure for an electrical connection with the at least one security pad; and
at least one sensing pin configured to receive an electrical signal, wherein a level of the electrical signal varies by detecting a change in a resistance according to whether the at least one security pad is electrically connected to the at least one contact structure, wherein, when at least a part of the case is removed, a level change of the electrical signal is detected, a secure erase process for deleting the secure data stored in the secure data area of the at least one secure memory is performed, and the normal data area included in the at least one nonvolatile memory continues to be accessible to the processor after the secure erase process is performed, wherein the at least one contact structure includes a first protrusion formed in the case and a resistive material formed in the case and spaced apart from the first protrusion, wherein the case is formed of a conductive material, wherein the first protrusion is directly in contact with the at least one security pad, and wherein the level of the electrical signal is changed according to the resistive material and whether the at least one security pad and the first protrusion are in electrical contact.

2. The storage device of claim 1, wherein:

when the at least one security pad and the at least one contact structure are electrically connected to each other, the at least one sensing pin is connected to a ground voltage and the electrical signal has a first level, and when the at least one security pad and the at least one contact structure are not electrically connected to each other, the at least one sensing pin is connected to a power supply voltage and the electrical signal has a second level.

3. The storage device of claim 1, wherein the at least one contact structure includes a security label attached to the case and electrically connected to the at least one sensing pin.

4. The storage device of claim 3, wherein:

the at least one data storage element includes a package substrate, and the at least one sensing pin is disposed on the package substrate.

5. The storage device of claim 1, wherein the case includes:

a lower case;

an upper case coupled with the lower case to cover the substrate and the at least one data storage element; and at least one screw coupling the lower case with the upper case, wherein the at least one contact structure is formed in at least one of the lower case and the upper case.

6. The storage device of claim 5, wherein:

when the lower case and the upper case are coupled by the at least one screw, the electrical connection between the at least one security pad and the at least one contact structure is maintained, and when the lower case and the upper case are separated by loosening the at least one screw, the electrical connection between the at least one security pad and the at least one contact structure is released.

7. The storage device of claim 1, wherein the at least one security pad includes a plurality of security pads randomly disposed on the substrate.

8. The storage device of claim 7, wherein the at least one contact structure includes:

a plurality of protrusions formed in the case to correspond to positions of the plurality of security pads; and a conductive polymer formed on at least one of the plurality of protrusions to electrically contact at least one of the plurality of security pads.

9. A method of operating a storage device, the method comprising:

detecting an abnormal access to the storage device using a plurality of physical sensing structures included in the storage device; and performing a step-wise secure process in which two or more secure algorithms associated with data stored in the storage device are sequentially executed, when the abnormal access to the storage device is detected, wherein the data includes normal data and secure data, wherein the storage device comprises:

at least one security pad;

at least one data storage element including at least one nonvolatile memory including a normal data area configured to store the normal data and at least one secure memory including a secure data area configured to store the secure data;

a case surrounding the at least one data storage element and including at least one contact structure for an electrical connection with the at least one security pad; and at least one sensing pin configured to receive an electrical signal, wherein a level of the electrical signal varies by detecting a change in a resistance according to whether the at least one security pad is electrically connected to the at least one contact structure, wherein the at least one security pad and the at least one contact structure form at least one of the plurality of physical sensing structures, wherein, when a level change of the electrical signal is detected, at least one of the two or more secure algorithms is executed, a secure erase process for deleting the secure data stored in the secure data area of the at least one secure memory is performed, and the normal data area included in the at least one nonvolatile memory continues to be accessible to a processor of the storage device after the secure erase process is performed, wherein the at least one contact structure includes a first protrusion formed in the case and a resistive material formed in the case and spaced apart from the first protrusion, wherein the case is formed of a conductive material, wherein the first protrusion is directly in contact with the at least one security pad, and wherein the level of the electrical signal is changed according to the resistive material and whether the at least one security pad and the first protrusion are in electrical contact.

10. The method of claim 9, wherein performing the step-wise secure process includes:

executing a first secure algorithm for blocking an access to the data, when the abnormal access is detected by a first physical sensing structure among the plurality of physical sensing structures; and executing a second secure algorithm for permanently deleting the data, when the abnormal access is detected by the first physical sensing structure and a second physical sensing structure among the plurality of physical sensing structures that is different from the first physical sensing structure.

11. The method of claim 10, wherein, when the second secure algorithm is executed, data stored after a specific time point is permanently deleted.

12. The method of claim 10, wherein, when the second secure algorithm is executed, data stored by a user is permanently deleted.

13. The method of claim 10, wherein, when the first secure algorithm is executed, the data are randomly rearranged such that access to the data is unavailable.

14. The method of claim 9, wherein:
the at least one data storage element includes a secure element,
the secure element is formed to be electrically attachable to and detachable from the storage device,
the method further comprises performing an authentication process for accessing the secure element, when the secure element is electrically connected to the storage device, and
secure data stored in the secure element is accessible only when the authentication process is successfully completed.

15. The method of claim 14, further comprising:
executing at least one of the two or more secure algorithms when the secure element is removed from the storage device.

16. A solid state drive (SSD) device comprising:
a substrate including at least one security pad;
a plurality of nonvolatile memories mounted on the substrate and including a normal data area configured to store normal data;
at least one secure memory mounted on the substrate and including a secure data area configured to store secure data;
a controller mounted on the substrate and configured to control operations of the plurality of nonvolatile memories and the secure memory;
a case surrounding the substrate, the plurality of nonvolatile memories, the secure memory, and the controller, and including at least one contact structure for an electrical connection with the at least one security pad; and
at least one sensing pin configured to receive an electrical signal,
wherein a level of the electrical signal varies by detecting a change in a resistance according to whether the at least one security pad is electrically connected to the at least one contact structure,
wherein, when at least a part of the case is removed, a level change of the electrical signal is detected, a secure erase process for permanently deleting the secure data stored in the secure data area of the at least one secure memory is performed, and the normal data area included in the at least one nonvolatile memory continues to be accessible to the controller after the secure erase process is performed,
wherein the at least one contact structure includes a first protrusion formed in the case and a resistive material formed in the case and spaced apart from the first protrusion,
wherein the case is formed of a conductive material,
wherein the first protrusion is directly in contact with the at least one security pad, and
wherein the level of the electrical signal is changed according to the resistive material and whether the at least one security pad and the first protrusion are in electrical contact.

* * * * *